US012701528B2

(12) United States Patent
Barawkar et al.

(10) Patent No.: US 12,701,528 B2
(45) Date of Patent: Aug. 4, 2026

(54) POLICY CONTROL FUNCTION (PCF) REGISTRATION BASED ON EQUIPMENT IDENTITY REGISTER (EIR) CHECK IN WIRELESS COMMUNICATION NETWORKS

(71) Applicant: T-MOBILE INNOVATIONS LLC, Overland Park, KS (US)

(72) Inventors: Kunal Prakash Barawkar, Bothell, WA (US); Swetha Gopisetti, Issaquah, WA (US); Suresh Thanneeru, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 218 days.

(21) Appl. No.: 18/461,811

(22) Filed: Sep. 6, 2023

(65) Prior Publication Data

US 2025/0081139 A1    Mar. 6, 2025

(51) Int. Cl.
*H04W 60/04* (2009.01)

(52) U.S. Cl.
CPC .................................. *H04W 60/04* (2013.01)

(58) Field of Classification Search
CPC ........ H04W 60/04; H04W 8/24; H04W 60/00
See application file for complete search history.

(56) References Cited

U.S. PATENT DOCUMENTS

| 11,160,125 | B2 | 10/2021 | Qiao et al. |
| 11,470,657 | B2 | 10/2022 | Youn et al. |

| 11,632,705 | B2 | 4/2023 | Talebi Fard et al. |
| 2019/0141606 | A1 | 5/2019 | Qiao et al. |
| 2019/0289459 | A1 | 9/2019 | Shan |
| 2020/0260401 | A1 | 8/2020 | So |
| 2020/0351762 | A1* | 11/2020 | Casati ..................... H04W 8/24 |
| 2020/0396678 | A1 | 12/2020 | Lee et al. |

(Continued)

FOREIGN PATENT DOCUMENTS

| CN | 109951877 A | 6/2019 |
| WO | 2020097031 A1 | 5/2020 |
| WO | 2020251309 A1 | 12/2020 |

OTHER PUBLICATIONS

"KI #1, Sol #1 : Updates to remove ENs"; 3GPP Draft S2-2004129; Jun. 2020; 8 pages; SA WG2 Meeting #139 E e-meeting; 3GPP; Sophia-Antipolis, France.

(Continued)

*Primary Examiner* — Kibrom T Hailu

(57) ABSTRACT

Various embodiments comprise a wireless communication network to qualify user devices for network policy association. In some examples, the wireless communication network comprises a network data system. The network data system receives an equipment identity check request transferred by a control plane that comprises an International Mobile Equipment Identifier (IMEI) for a User Equipment (UE). The network data system reads the IMEI to determine a Type Allocation Code (TAC) for the UE. The network data system compares the TAC for the UE to an IMEI TAC database indicating when Policy Control Function (PCF) registration is available for the UE and determines when the PCF registration is when is available for the UE. The network data system transfers an equipment identity check response that indicates when the PCF registration is available for the UE to the control plane.

20 Claims, 15 Drawing Sheets

100

(56)         References Cited

U.S. PATENT DOCUMENTS

| 2022/0095260 | A1 | 3/2022 | Shan |
| 2022/0191100 | A1 | 6/2022 | Kim et al. |
| 2022/0201638 | A1 | 6/2022 | Arrobo Vidal et al. |
| 2022/0272620 | A1 | 8/2022 | Ninglekhu et al. |
| 2022/0322202 | A1 | 10/2022 | Li et al. |
| 2023/0083175 | A1 | 3/2023 | Xiong |
| 2023/0189187 | A1 | 6/2023 | Velev et al. |
| 2025/0063525 | A1 | 2/2025 | Barawkar et al. |

OTHER PUBLICATIONS

"KI#2: Merging solutions 15 and 16"; 3GPP Draft S2-2207763; Aug. 2022; 8 pages; 3GPP TSG-SA WG2#152E e-meeting; 3GPP; Sophia-Antipolis, France.

\* cited by examiner

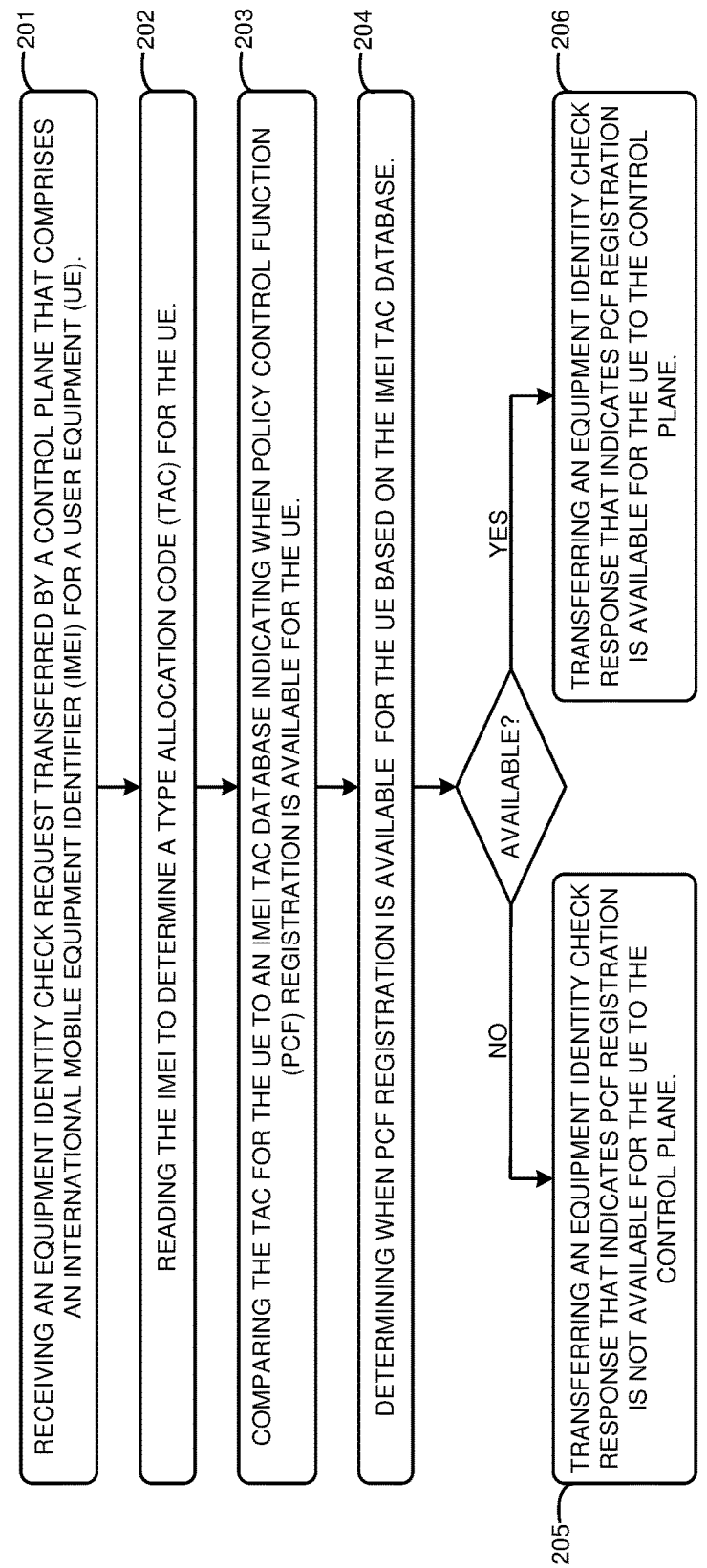

201 — RECEIVING AN EQUIPMENT IDENTITY CHECK REQUEST TRANSFERRED BY A CONTROL PLANE THAT COMPRISES AN INTERNATIONAL MOBILE EQUIPMENT IDENTIFIER (IMEI) FOR A USER EQUIPMENT (UE).

202 — READING THE IMEI TO DETERMINE A TYPE ALLOCATION CODE (TAC) FOR THE UE.

203 — COMPARING THE TAC FOR THE UE TO AN IMEI TAC DATABASE INDICATING WHEN POLICY CONTROL FUNCTION (PCF) REGISTRATION IS AVAILABLE FOR THE UE.

204 — DETERMINING WHEN PCF REGISTRATION IS AVAILABLE FOR THE UE BASED ON THE IMEI TAC DATABASE.

AVAILABLE?

YES

206 — TRANSFERRING AN EQUIPMENT IDENTITY CHECK RESPONSE THAT INDICATES PCF REGISTRATION IS AVAILABLE FOR THE UE TO THE CONTROL PLANE.

NO

205 — TRANSFERRING AN EQUIPMENT IDENTITY CHECK RESPONSE THAT INDICATES PCF REGISTRATION IS NOT AVAILABLE FOR THE UE TO THE CONTROL PLANE.

POLICY CONTROL FUNCTION (PCF) REGISTRATION BASED ON EQUIPMENT IDENTITY REGISTER (EIR) CHECK IN WIRELESS COMMUNICATION NETWORKS

TECHNICAL FIELD

Various embodiments of the present technology relate to User Equipment (UE) registration, and more specifically, to selectively registering the UE with the Policy Control Function (PCF) based on the International Mobile Equipment Identity Type Allocation Code (IMEI TAC) for the UE.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices. Exemplary network functions include Access and Mobility Management Function (AMF) and Policy Control Function (PCF).

Network registration is a process performed by the network core to confirm the identity of a user device and determine what services the user device is authorized to receive. To initiate network registration, a user device transfers a registration request over a RAN for delivery to an AMF. The AMF interacts with other network functions in the network core to confirm the identity of the user device, typically by transferring an authentication challenge to the device and comparing the challenge response generated by the device to an expected result. Once the identity of the device is confirmed, the AMF interacts with other network functions to retrieve data characterizing the device's service subscription and registers the user device with the PFC. The PCF provides network rules and policies that govern the behavior of the user device on the network to the AMF which then provides the rules to the user device.

Device capabilities vary between different types of user devices. Some user devices do not comprise the capability to enforce rules provided by the PCF. However, the AMF performs PCF registration for all devices registering on the network, even for devices that do not have the capability to enforce rules provided by the PCF. These unnecessary registrations result in excessive signaling towards the PCF which may degrade its performance. Unfortunately, wireless communication networks do not efficiently register user devices with the PCF. Moreover, the wireless communication networks do not effectively inhibit PCF registration for devices that lack the capability to enforce rules provided by the PCF.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for User Equipment (UE) registration. Some embodiments comprise a method of operating a wireless communication network to qualify user devices for network policy association. The method comprises receiving an equipment identity check request transferred by a control plane that comprises an International Mobile Equipment Identifier (IMEI) for a UE. The method further comprises reading the IMEI to determine a Type Allocation Code (TAC) for the UE. The method further comprises comparing the TAC for the UE to an IMEI TAC database indicating when Policy Control Function (PCF) registration is available for the UE and determining when the PCF registration is when is available for the UE. The method further comprises transferring an equipment identity check response that indicates when the PCF registration is available for the UE to the control plane.

Some embodiments comprise a wireless communication network to qualify user devices for network policy association. The wireless communication network comprises a network data system. The network data system receives an equipment identity check request transferred by a control plane that comprises an IMEI for a UE. The network data system reads the IMEI to determine a TAC for the UE. The network data system compares the TAC for the UE to an IMEI TAC database indicating when PCF registration is available for the UE and determines when the PCF registration is when is available for the UE. The network data system transfers an equipment identity check response that indicates when the PCF registration is available for the UE to the control plane.

Some embodiments comprise one or more non-transitory computer-readable storage media having program instructions stored thereon to qualify user devices for network policy association. When executed by a computing system, the program instructions direct the computing system to perform operations. The operations comprise receiving an equipment identity check request transferred by a control plane that comprises an IMEI for a UE. The operations further comprise reading the IMEI to determine a TAC for the UE. The operations further comprise comparing the TAC for the UE to an IMEI TAC database indicating when PCF registration is available for the UE and determining when the PCF registration is when is available for the UE. The operations further comprise transferring an equipment identity check response that indicates when the PCF registration is available for the UE to the control plane.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the data network to qualify the user device for network policy association.

Figure 1:
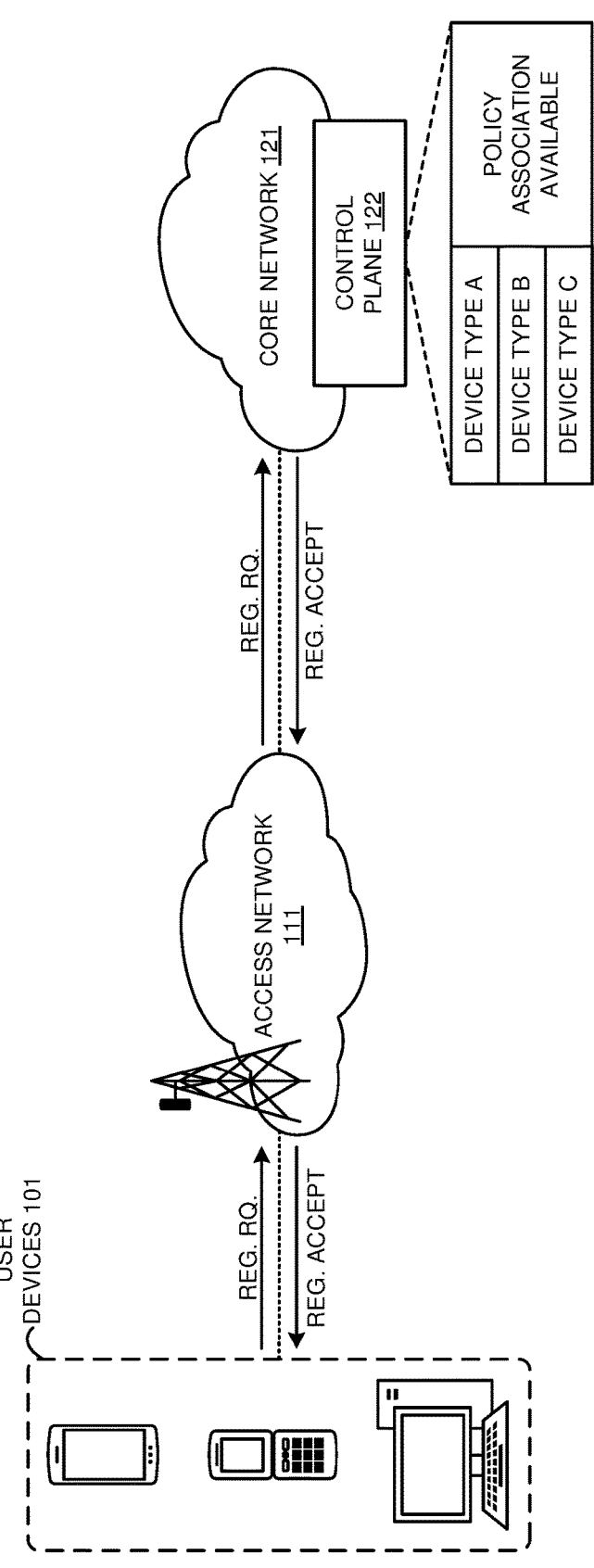
FIG. 1 illustrates a data network to qualify a user device for network policy association.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates data network 100 network to qualify a user device for network policy association. Data network 100 delivers services like voice calling, machine communications, internet-access, media-streaming, or some other wireless/wireline communications product to user devices. Data network 100 comprises user devices 101, access network 111, and core network 121. Core network 121 comprises control plane 122. In other examples, data network 100 may comprise additional or different elements than those illustrated in FIG. 1.

Various examples of network operation and configuration are described herein. In some examples, control plane 122 detects registration requests (REG. RQ.) for user devices 101. Registration entails a set of authentication and authorization procedures to confirm the identity of a user device and determine what services the user device is subscribed to. In response to the registration requests, control plane 122 registers user devices 101 for wireless data services and requests device type indications from device 101. As illustrated in FIG. 1, the individual ones of user devices 101 comprise different device types. User devices 101 transfer device type indications for delivery to control plane 122. Control plane 122 receives the device type indications for each one user device 101. As illustrated in FIG. 1, control plane 122 hosts a table that correlates policy association availability for device types A, B, and C. Policy association entails registering a user device with a policy control entity to determine rules that govern the behavior of the user device on the data network. Control plane 122 determines if network policy association is available for user devices 101 based on the device type indications for user devices 101. For example, control plane 122 may compare the device type indication for one of devices 101 to the table to determine if policy association is available for that device.

When policy association is available for one or more of user devices 101, control plane 122 registers those ones of user devices 101 with the policy control entity (not illustrated) in core network 121. Exemplary policy control entities comprise Policy Control Function (PCF) and Policy Rules and Charging Function (PCRF). Control plane 122 receives network policies from the policy control entity for user devices 101. Control plane 122 transfers registration accept messages for delivery to user devices 101 that include the network polices received from the policy control entity. Exemplary network policies include User Equipment Route Selection Policy (URSP) rules, registration control rules, access rules, mobility rules, and the like. When policy association is not available for one or more of user devices 101, control plane 122 forgoes registering those ones of user devices 101 with the policy control entity in core network 121. Since control plane 122 does not register the non-qualified ones of user devices 101 with the policy control entity, control plane 122 does not receive any network polices (e.g., URSP rules) for the non-qualified ones of user devices 101 from the policy control entity. Control plane 122 transfers registration accept messages for delivery to the non-qualified ones of user devices 101 that does not include network polices received from the policy control entity.

User devices 101 are representative of wireless/wireline user devices. Exemplary user devices include phones, smartphones, computers, vehicles, drones, robots, sensors, and/or other devices with wireless communication capabilities. Access network 111 exchanges wireless signals with user devices 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or other types of wireless/wireline access systems to provide wireless links to user devices 101, the backhaul links to core network 121, and the edge computing services between user devices 101 and core network 121.

Access network 111 comprises wireless access nodes to serve user devices 101. The access nodes may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121.

Core network 121 is representative of computing systems that provide wireless data services to user devices 101 over access network 111. Exemplary computing systems comprise data centers, server farms, cloud computing networks, hybrid cloud networks, and the like. The computing systems of core network 121 store and execute the network functions to form control plane 122 to provide wireless data services to user devices 101 over access network 111. Control plane 122 may comprise network functions like Access and Mobility Management Function (AMF), Mobility Management Entity (MME), Session Management Function (SMF), PCF, PCRF, Unified Data Management (UDM), Unified Data Registry (UDR), Equipment Identity Register (EIR), and the like. The computing systems of core network 121 typically store and execute other network functions to form a user plane (not illustrated) to support user data exchange over network 121. The user plane typically comprises network functions like User Plane Function (UPF), edge UPF, Packet Gateway (P-GW), Session Gateway (S-GW), and the like. Core network 121 may comprise a Fifth Generation Core (5GC) architecture and/or an Evolved Packet Core (EPC) architecture.

FIG. 2 illustrates process 200. Process 200 comprises an exemplary operation of data network 100 to qualify a user device for network policy association. The operation may vary in other examples. The operations of process 200 comprise receiving an equipment identity check request transferred by a control plane that comprises an International Mobile Equipment Identifier (IMEI) for a User Equipment (UE) (step 201). The operations further comprise reading the IMEI to determine a Type Allocation Code (TAC) for the UE (step 202). The operations further comprise comparing the TAC for the UE to an IMEI TAC database indicating when PCF registration is available for the UE (step 203). The operations further comprise determining when PCF registration is available based on the IMEI TAC database (step 204). When PCF registration is not available, the operations further comprise transferring an equipment identity check response that indicates PCF registration is not available for the UE to the control plane (step 205). When PCF registration is available, the operations further comprise transferring an equipment identity check response that indicates PCF registration is available for the UE to the control plane (step 206).

Figure 3:
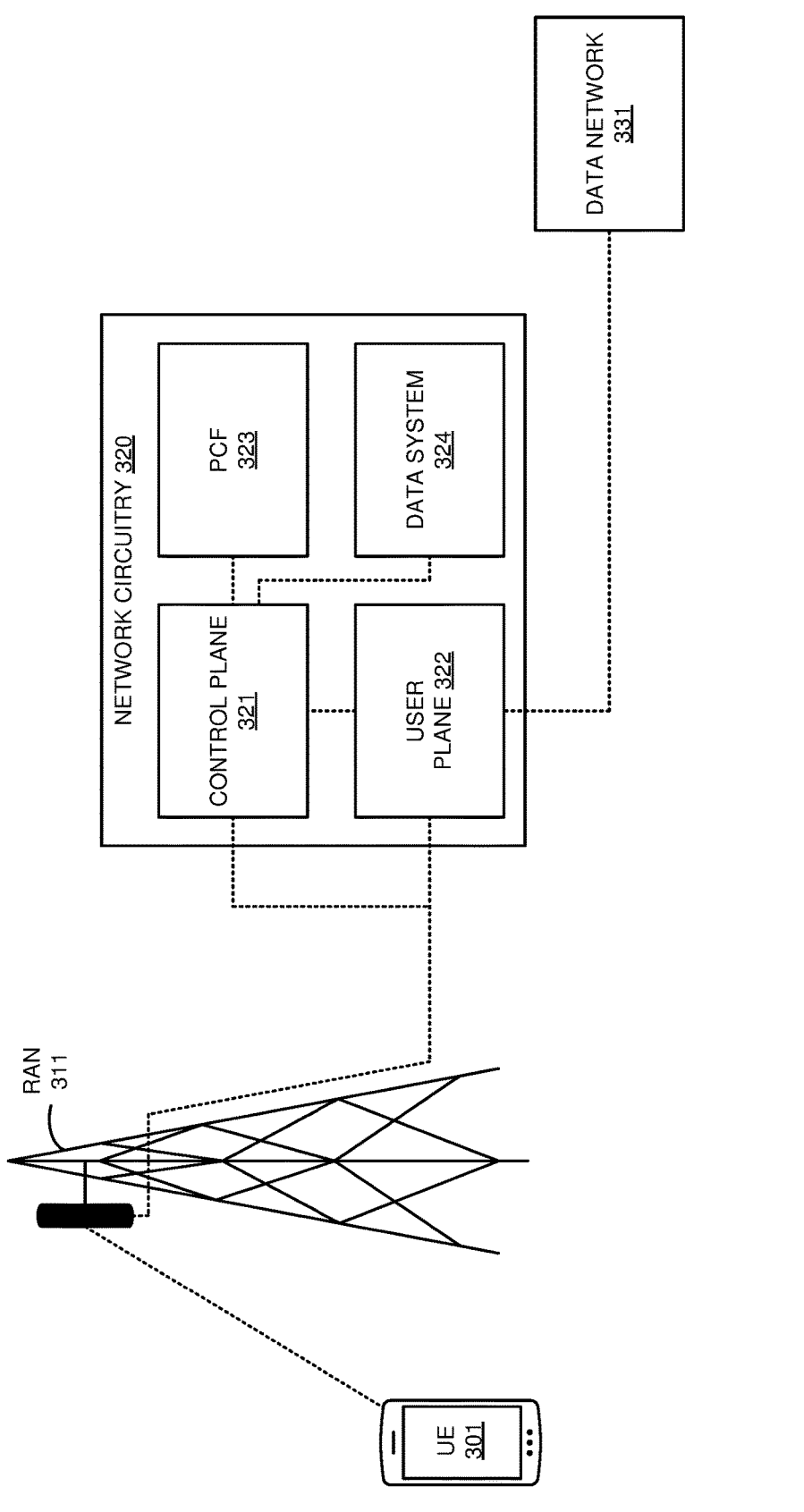
FIG. 3 illustrates a wireless communication network to qualify a wireless User Equipment (UE) for network policy association.

FIG. 3 illustrates wireless communication network 300 network to qualify a wireless UE for network policy association. Wireless communication network 300 is an example of data network 100, however network 100 may differ. Wireless communication network 300 comprises UE 301, RAN 311, network circuitry 320, and data network 331. Network circuitry 320 comprises control plane 321, user plane 322, PCF 323, and data system 324. In other examples, wireless network 300 may comprise additional or different elements than those illustrated in FIG. 3.

In some examples, UE 301 attaches to control plane 321 over RAN 311 and transfers a registration request to control plane 321. Control plane 321 receives the registration request and interacts with data system 324 to authenticate the identity of UE 301. In response to the authentication, control plane 321 registers UE 301. Control plane 321 transfers a request for device type information to UE 301 over RAN 311. UE 301 transfers a device type indication to control plane 321 over RAN 311. For example, control plan 121 may request the IMEI number from UE 301 and UE 301 may indicate its IMEI number to control plane 321. The IMEI is a numeric code used to identify device types or other device attributes for UE. Control plane 321 transfers the device type indication to network data system 324 to determine if UE 301 qualifies for PCF registration. Data system 324 hosts a whitelist, blacklist, or some other type of data structure that correlates PCF registration availability to device type indications. For example, data system 324 may host a whitelist comprising IMEI TACs that qualify for PCF registration. For example, data system 324 may host a blacklist comprising IMEI TACs that do not qualify for PCF registration. The IMEI TAC comprises the first eight digits of the IMEI and is a unique code that identifies the device type of a UE. Data system 324 determines when PCF registration is available for UE 301 and indicates the availability (or lack thereof) to control plane 321.

Control plane 321 requests service metrics for UE 301 from data system 324. Data system 324 returns the requested service metrics to control plane 321. The service metrics comprise information like Quality-of-Service (QoS) levels, service attributes, slice information, and the like. When data system 324 determines that UE 301 qualifies for PCF registration, control plane 321 transfers a PCF registration request to PCF 323 to create a policy association for UE 301. PCF 323 registers UE 301 and returns network policies to control plane 321 that govern the behavior of UE 301 on wireless network 300. Control plane 321 transfers a registration accept message to UE 301 over RAN 311. The registration accept message indicates that the registration was successful and comprises the network policies received from PCF 323. When data system 324 determines that UE 301 does not qualify for PCF registration, control plane 321 does not transfer a PCF registration request to PCF 323 to create a policy association for UE 301. Control plane 321 transfers a registration accept message to UE 301 over RAN 311 that the registration request transferred by UE 301 is accepted but does not comprise any network policies received from PCF 323.

Advantageously, wireless communication network 300 efficiently registers user devices with the PCF. Moreover, wireless communication network 300 effectively inhibits PCF registration for devices that lack the capability to enforce rules provided by the PCF by screening for these devices based on their device type.

UE 301 and RAN 311 communicate over links using wireless technologies like 5GNR, LTE, LP-WAN, WIFI, Bluetooth, and/or some other type of wireless networking protocol. The wireless technologies use electromagnetic frequencies in the low-band, mid-band, high-band, or some other portion of the electromagnetic spectrum. RAN 311, network circuitry 320, and data network 331 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliance with wireless or wireline communication circuitry. Although RAN 311 is illustrated as a tower, RAN 311 may comprise another type of mounting structure (e.g., buildings), or no mounting structure at all. RAN 311 comprises Fifth Generation (5G) RANs, LTE RANs, gNodeBs, eNodeBs, NB-IoT access nodes, LP-WAN base stations, wireless relays, WIFI hotspots, Bluetooth access nodes, and/or other types of wireless or wireline network transceivers. UE 301, and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF and the like. Data system 324 comprises network entities like UDM, UDR, EIR, and the like.

UE 301, RAN 311, network circuitry 320, and data network 331 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
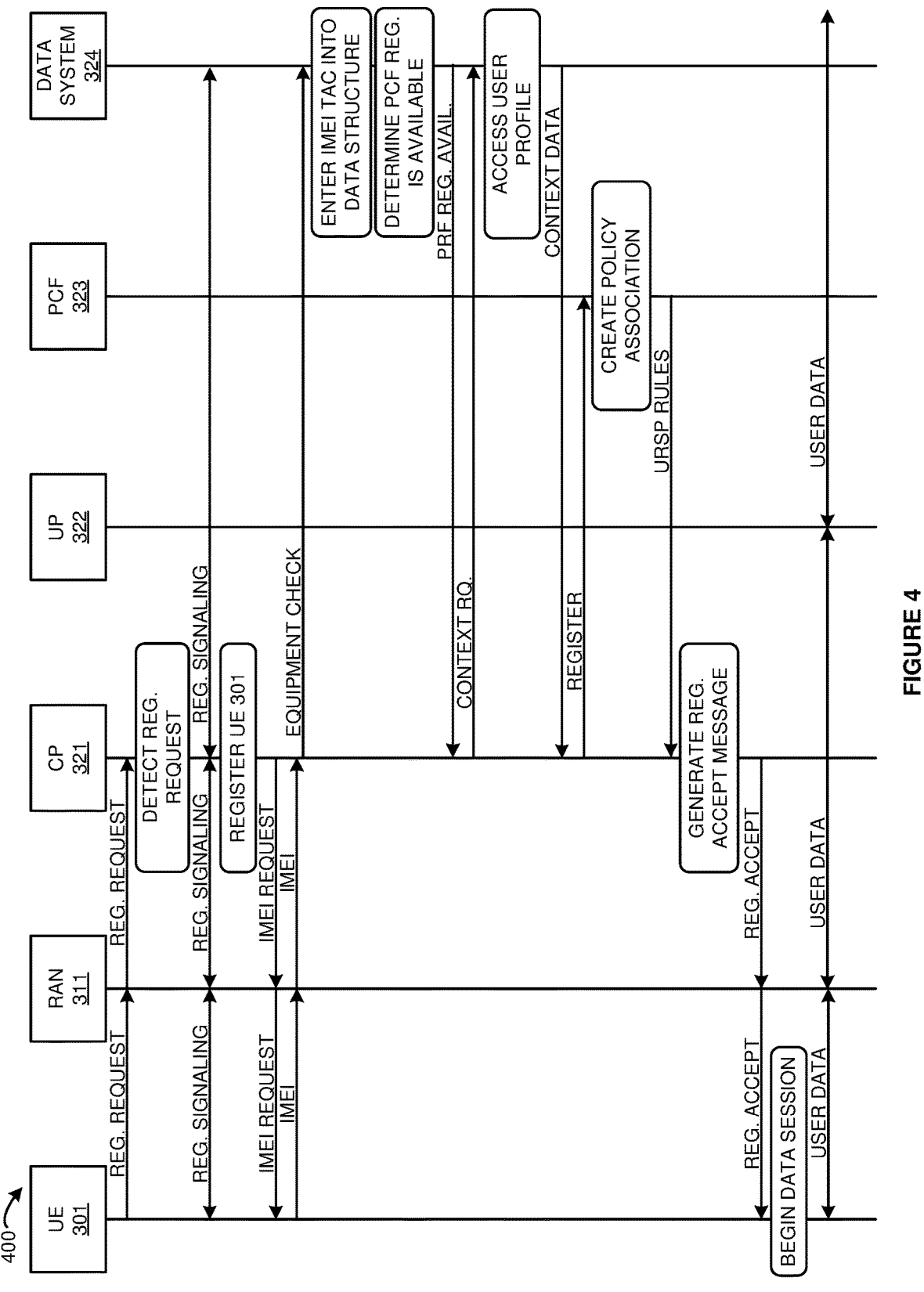
FIG. 4 illustrates an exemplary operation of the wireless communication network to qualify the wireless UE for network policy association.
Figure 5:
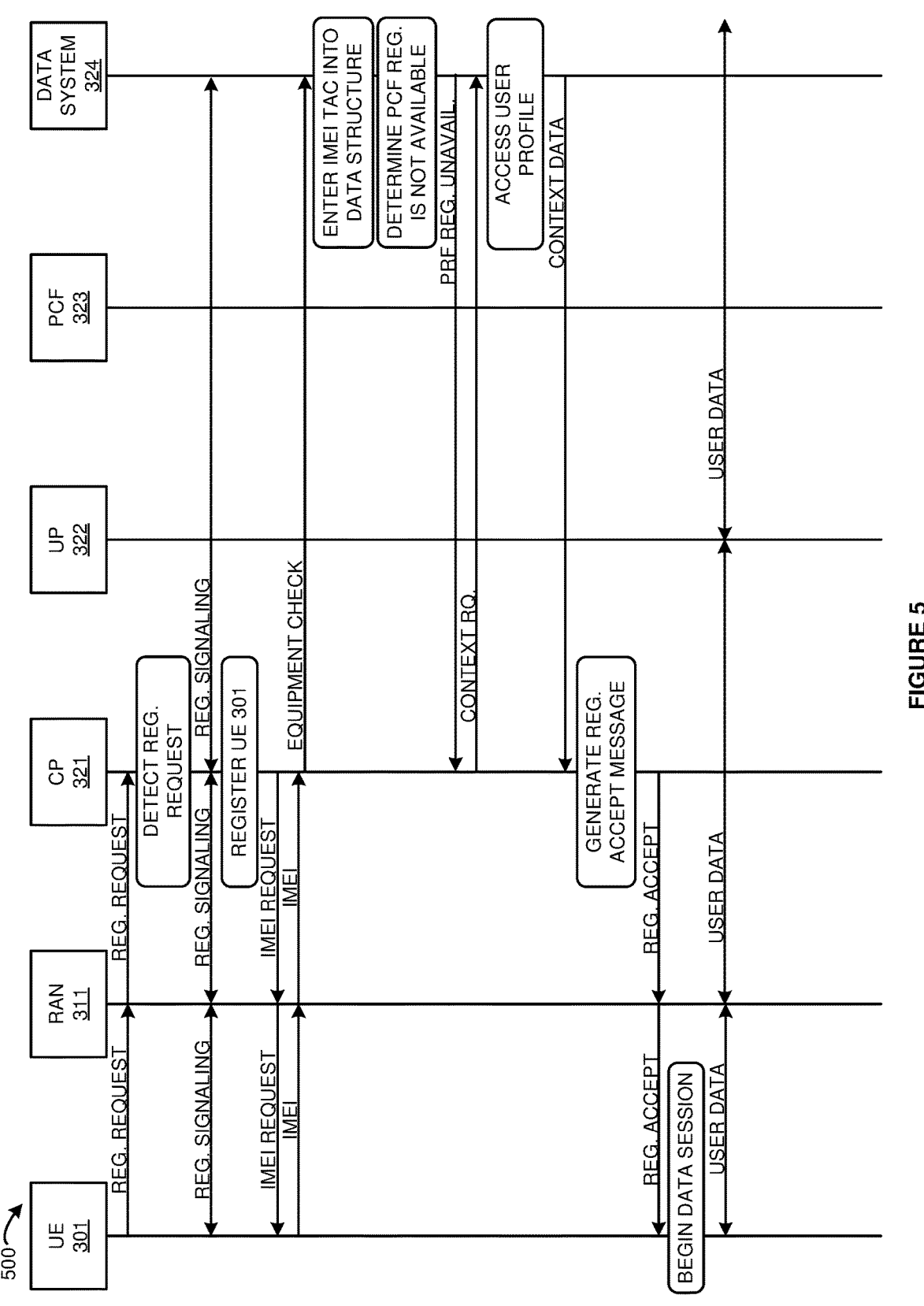
FIG. 5 illustrates an exemplary operation of the wireless communication network to qualify the wireless UE for network policy association.

FIGS. 4 and 5 illustrate processes 400 and 500 respectively. Processes 400 and 500 comprise exemplary operations of wireless communication network 300 to qualify a wireless UE for network policy association. FIG. 4 illustrates an example where UE 301 qualifies for network policy association while FIG. 5 illustrates an example where UE 301 does not qualify for network policy association.

Referring to FIG. 4, UE 301 attaches to RAN 311 and wirelessly transfers a registration (REG.) request to RAN 311. RAN 311 forwards the registration to control plane (CP) 321. Control plane 321 detects the registration request and in response, exchanges registration signaling with UE 301 over RAN 311 and with network data system 324 to authenticate UE 301. Responsive to the authentication, control plane 321 registers UE 301 for wireless data services and transfers an IMEI request to UE 301. UE 301 retrieves its IMEI from memory and transfers its IMEI to control plane 321 over RAN 311. Control plane 121 transfers an equipment check request comprising the IMEI to data system 324. Data system 324 reads the first eight digits of the IMEI received from UE 301 to determine the TAC of UE 301. Data system 324 enters the TAC for UE 301 into a data structure that outputs an indication as to whether UE 301 can register with PCF 323. In this example, the data structure outputs an indication that UE 301 can register with PCF 323 and data system 324 indicates the PCF registration availability to control plane 321.

Control plane 321 transfers a context request (RQ.) for UE 301 to data system 324 to retrieve service attributes that characterize the level of data services for UE 301. In response to the context request, data system 324 accesses a user profile for UE 301 and retrieves the requested service metrics for UE 301. Data system 324 transfers the service metrics to control plane 321. Since PCF registration is available for UE 301, control plane 321 transfers a registration request for UE 301 to PCF 323. PCF 323 creates a policy association for UE 301 and returns URSP rules for UE 301 to control plane 321. Control plane 321 generates registration accept message comprising the service metrics received from data system 324 and the URSP rules received from PCF 323. Control plane 321 transfers the registration accept message to RAN 311 which wirelessly transfers the registration accept message to UE 301. UE 301 begins a data session and exchanges user data for the session with user plane (UP) 322 over RAN 311. User plane 322 exchanges the user data with data network 331. UE 301 uses the URSP rules to route the user data to the appropriate network slices in user plane 322.

Referring to FIG. 5, in operation, UE 301 attaches to RAN 311 and wirelessly transfers a registration request to RAN 311. RAN 311 forwards the registration to control plane 321. Control plane 321 detects the registration request and exchanges registration signaling with UE 301 and network data system 324 to authenticate UE 301. Responsive to the authentication, control plane 321 registers UE 301 for wireless data services and transfers an IMEI request to UE 301. UE 301 transfers its IMEI to control plane 321 over RAN 311. Control plane 121 transfers an equipment check request comprising the IMEI to data system 324. Data system 324 reads the TAC of the IMEI received from UE 301 and enters the TAC for UE 301 into a data structure that outputs an indication as to whether UE 301 can register with PCF 323. In this example, the data structure outputs an indication that the TAC for UE 301 is prohibited from PCF registration and data system 324 indicates that PCF registration is unavailable for UE 301 to control plane 321. In response, control plane 321 determines to skip PCF registration for UE 301.

Control plane 321 transfers a context request for UE 301 to data system 324 to retrieve service attributes that characterize the level of data services for UE 301. Data system 324 accesses a user profile for UE 301, retrieves the requested service metrics for UE 301, and transfers the service metrics to control plane 321. Control plane 321 generates registration accept message comprising the service metrics received from data system 324. Since PCF registration did not occur, control plane 321 did not receive any network policies for UE 301 (e.g., URSP rules) from PCF 323. Consequently, control plane 321 does not include any network policies from PCF 323 in the registration accept message. Control plane 321 transfers the registration accept message to RAN 311. RAN 311 wirelessly transfers the registration accept message to UE 301. UE 301 begins a data session and exchanges user data for the session with user plane 322 over RAN 311. User plane 322 exchanges the user data with data network 331.

Figure 6:
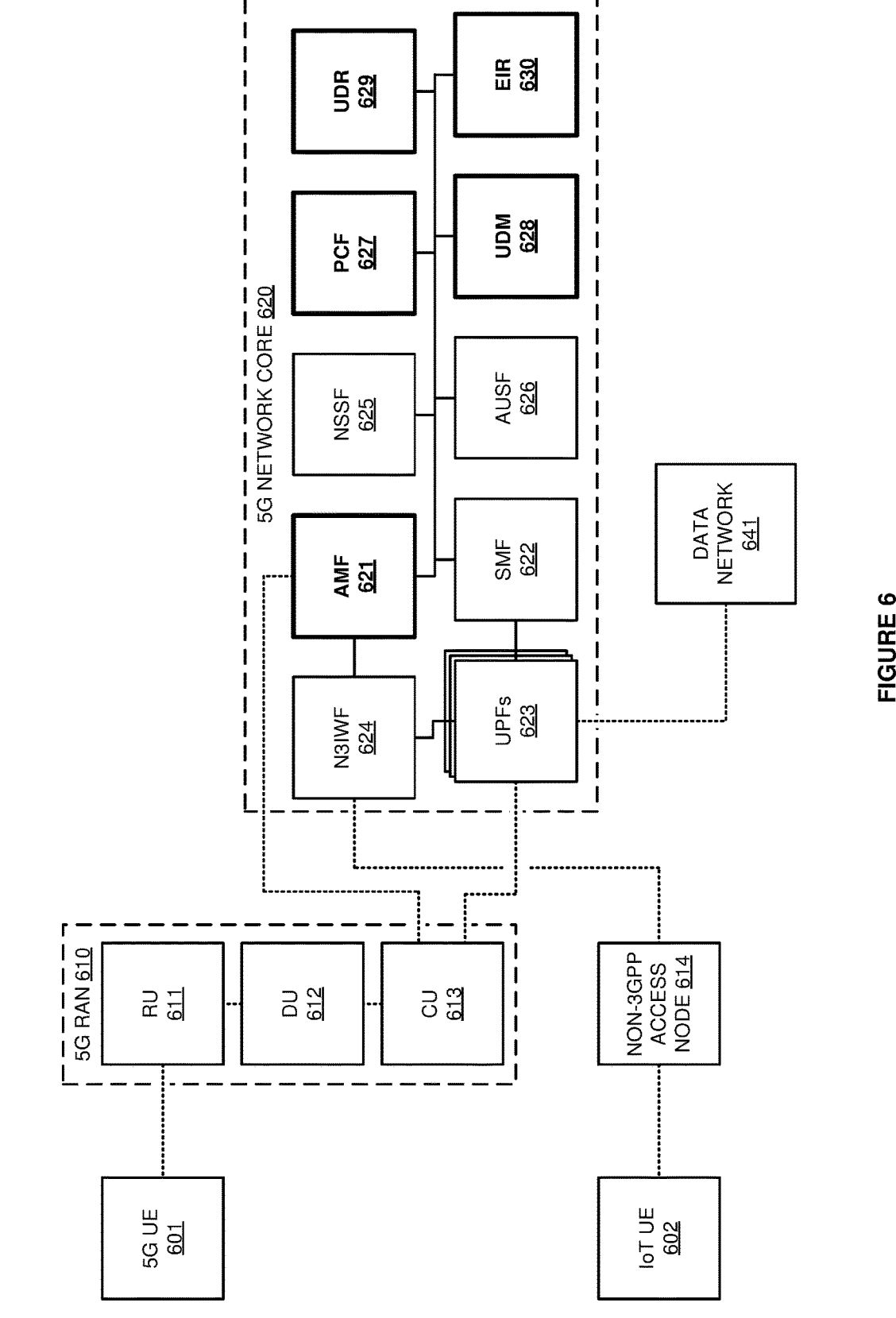
FIG. 6 illustrates a Fifth Generation (5G) wireless communication network to qualify UE for Policy Control Function (PCF) registration.

FIG. 6 illustrates 5G communication network 600 to qualify UE for PCF registration. 5G communication network 600 comprises an example of data network 100 illustrated in FIG. 1 and wireless communication network 300 illustrated in FIG. 3, however networks 100 and 300 may differ. 5G communication network 600 comprises 5G UE 601, Internet-of-Things (IoT) UE 602, 5G RAN 610, non-Third Generation Partnership Project (3GPP) access node 614, 5G network core 620, and data network 641. 5G RAN 610 comprises Radio Unit (RU) 611, Distributed Unit (DU) 612, and Centralized Unit (CU) 613. 5G network core 620 comprises Access and Mobility Management Function (AMF) 621, Session Management Function (SMF) 622, User Plane Functions (UPFs) 623, Non-3GPP Interworking Function (N3IWF) 624, Network Slice Selection Function (NSSF) 625, Authentication Server Function (AUSF) 626, Policy Control Function (PCF) 627, Unified Data Management (UDM) 628, Unified Data Registry (UDR) 629, and Equipment Identity Register (EIR) 630. Other network functions and network entities like Network Repository Function (NRF), Session Communication Proxy (SCP), Network Exposure Function (NEF), and Application Function (AF) are typically present in 5G network core 620 but are omitted for clarity. In other examples, 5G communication network 600 may comprise different or additional elements than those illustrated in FIG. 6.

In some examples, 5G UE 601 wirelessly attaches to CU 613 in RAN 610 over RU 611 and DU 612. UE 601 exchanges attachment signaling with CU 613 to establish a signaling radio bearer with the 5G network applications hosted by CU 613. UE 601 transfers a registration request over the default signaling bearer to CU 613. The registration request includes information like a registration type, UE capabilities, requested slice types, Protocol Data Unit (PDU) session requests, and the like. CU 613 forwards the registration request for UE 601 to AMF 621. In response to the registration request, AMF 621 transfers an identity request to UE 601 over RAN 610. UE 601 indicates its Subscriber Concealed Identifier (SUCI) to CU 613 over the default signaling radio bearer. CU 613 forwards the SUCI to AMF 621. AMF 621 selects AUSF 626 to authenticate the identity of UE 601 and transfers an authentication request that includes the SUCI to AUSF 626. AUSF 626 requests authentication vectors from and indicates the SUCI for UE 601 to UDM 628. UDM 628 generates authentication vectors for UE 601. UDM 628 returns the vectors and the Subscriber Permanent Identifier (SUPI) for UE 601 to AUSF 626. The vectors include an authentication challenge, key selection criteria, and a random number. For example, UDM 628 may retrieve a secret key from the subscriber profile of UE 601 stored by UDR 629 and hash the random number with the secret key to generate the authentication challenge. AUSF 626 transfers the SUPI and authentication vectors to AMF 621. AMF 621 indicates the authentication type and transfers the authentication challenge, key selection criteria, and random number to UE 601 over RAN 610. UE 601 hashes the random number using its copy of the secret key to generate an authentication response transfers the response to AMF 621 over RAN 610.

AMF 621 determines the authentication response generated by UE 601 and the expected result match responsively registers UE 601 with network core 620. AMF 621 transfers an IMEI request to UE 601 to determine the device type for UE 601. UE 601 retrieves its IMEI from memory and indicates its IMEI to AMF 621 over RAN 610. AMF 621 transfers an equipment identity check request comprising the IMEI to EIR 630. The equipment identity check comprises an N15 registration parameter to trigger PCF registration qualification for the UE by EIR 630. EIR 630 determines if UE 601 is blacklisted on the network based on the IMEI. EIR 630 detects the N15 registration parameter and reads the first eight digits of the IMEI to determine the TAC for UE 601. EIR 630 hosts a whitelist that identifies TACs that qualify for PCF registration and the type of PCF registration type that is allowed. For example, the whitelist may identify a range of TACs eligible for PCF registration. Exemplary PCF registration types include access and mobility policy registration and UE policy registration. In response to the N15 registration parameter, EIR 630 compares the TAC for UE 601 to the whitelist and determines that the TAC for UE 601 is whitelisted for PCF registration and determines if UE 601 qualifies for access and mobility policy PCF registration, UE policy PCF registration, or both. EIR 630 transfers a response to AMF 621 indicating UE 601 is not blacklisted on the network, that UE 601 is whitelisted for PCF registration, and the PCF registration types UE 601 is eligible for.

Responsive to the successful registration and equipment check, AMF 621 selects UDM 628 to generate UE context for UE 601. AMF 621 registers with UDM 628 and requests access and mobility subscription data, SMF selection data, and UE context SMF data from UDM 628. UDM 628 accesses the subscriber profile for UE 601 stored by UDR 629 and retrieves the requested data. UDM 628 transfers the access and mobility subscription data, the SMF selection data, and the UE context SMF data to AMF 621. AMF 621 creates UE context using the received data. The UE context comprises information like QoS metrics, slice selection information, S-NSSAIs, subscribed service features, PDU session information, and the like.

Since UE 601 is whitelisted for PCF registration, AMF 621 selects PCF 627 to create a network policy association for UE 601. Depending on the allowed PCF registration type, AMF 621 registers UE 601 with PCF 627 for access and mobility policy association, UE policy association, or both. In this example, UE 601 is whitelisted for both PCF registration types. PCF 627 registers UE 601 and transfers access and mobility policy information and UE policy including URSP rules for UE 601 to AMF 621. PCF 627 subscribes for event reporting from AFM 621 like registration state change events for UE 601.

AMF 621 selects NSSF 625 to select network slices for UE 601. AMF 621 indicates the network slices requested by UE 601 in the registration request and the slice selection information retrieved in the UE context to NSSF 625. NSSF 625 uses the selection information and the requested network slices to select a set of network slices for UE 601. NSSF 625 returns slice IDs for the selected slices to AMF 621. For example, NSSF 625 may select a non-GBR slice, a GBR slice, and an eMBB slice for UE 601. In this example, each network slice corresponds to one of UPFs 623, however the network slices may comprise additional network functions (e.g., SMF 622) and/or multiple ones of UPFs 623.

AMF 621 selects SMF 622 to serve UE 601 based on the SMF selection data, slice IDs, QoS metrics, requested PDU sessions, service attributes, and/or other data retrieved UDM 628 or received in the registration request from UE 601. SMF 622 directs ones of UPFs 623 that correspond to the slice IDs selected by NSSF 625 to serve UE 601. SMF 622 transfers the network addresses for the selected ones of UPFs 623 to AMF 621. AMF 621 includes the policy UE policy rules provided by PCF 627, the slice IDs returned by NSSF 625, and the network addresses for the UPFs selected by SMF 622 in the UE context. AMF 621 transfers a registration accept message that comprises the UE context to CU 613. CU 613 wirelessly transfers the registration accept message to UE 601 over DU 612 and RU 611 along the default radio signaling bearer. UE 601 stores the UE context in memory.

UE 601 uses the UE context to initiate PDU sessions with network core 620. For example, UE 601 may begin a non-GBR PDU session over a non-GBR slice, a GBR PDU session over a GBR slice, and an eMBB PDU session over an eMBB slice. UE 601 generates uplink user data for its PDU sessions. UE 601 uses the access rules, mobility rules, and URSP rules provided by PCF 627 to map traffic to the appropriate PDU session and wirelessly transfers the uplink data to CU 613 over RU 611 and DU 612. CU 613 transfers the uplink user data to the ones UPFs 623 that compose the selected network slices of UE 601. The ones of UPFs 623 transfer the uplink data to data network 641. Data network 641 generates downlink data for the PDU sessions and transfers the downlink data to the ones of UPFs 623. The ones of UPFs 623 transfer the downlink data to CU 613. CU 613 wirelessly transfers the downlink data to UE 601 over DU 612 and RU 611.

IoT UE 602 attaches to non-3GPP access node 614. This connection may be wireless or wireline. For example, IoT UE 602 may attach to non-3GPP access node 614 over a wireless WIFI link or a wired ENET link. UE 602 exchanges attachment signaling with access node 614 to establish a signaling bearer with the non-3GPP network applications hosted by access node 614. UE 602 transfers a registration request over the default signaling bearer to node 614. The registration request includes information like a registration type, UE capabilities, requested slice types, PDU session requests, and the like. Since UE 602 is an IoT device and does not possess the same capabilities as 5G UE 601, it should be appreciated that the registration request sent by UE 602 may be different. Access node 614 forwards the registration request for UE 602 to AMF 621 over N3IWF 624. In this example, non-3GPP access node 614 comprises an untrusted 3GPP network. In examples where access node 614 comprises a trusted 3GPP network, N3IWF 624 is replaced with a Trusted Non-3GPP Gateway Function (TNGF).

In response to the registration request, AMF 621 transfers an identity request to UE 602 over N3IWF 624 and access node 614. UE 602 indicates its IoT device ID to AMF 621 over access node 614 and N3IWF 624. AMF 621 selects AUSF 626 to authenticate the IoT device ID provided by UE 602. AMF 621 transfers an authentication request that includes the IoT device ID to AUSF 626. AUSF 626 requests authentication vectors from and indicates the IoT device ID for UE 602 to UDM 628. UDM 628 generates authentication vectors comprising an authentication challenge, key selection criteria, and a random number for UE 602 and returns the vectors and SUPI for UE 602 to AUSF 626. AUSF 626 returns the SUPI and authentication vectors to AMF 621. AMF 621 indicates the authentication type and transfers the authentication challenge to UE 602 over N3IWF 624 and access node 614. UE 602 generates an authentication response and transfers the response to AMF 621 over access node 614 and N3IWF 624.

AMF 621 matches the authentication response generated by UE 602 with the expected result responsively registers UE 602 with network core 620. AMF 621 transfers an IMEI request to UE 602 to determine its device type. UE 602 retrieves its IMEI from memory and indicates its IMEI to AMF 621 over RAN 610. AMF 621 transfers an equipment identity check request comprising the IMEI and N15 registration parameter to EIR 630. EIR 630 determines UE 602 is not blacklisted on the network based. In response to the N15 registration parameter, EIR 630 compares the TAC for UE 602 to the whitelist and determines that the TAC for UE 602 is not whitelisted for PCF registration. EIR 630 transfers a response to AMF 621 indicating UE 602 is authorized to access the network and that the device type for UE 602 does not qualify for PCF registration.

Responsive to the successful registration and equipment check, AMF 621 selects UDM 628 to generate UE context for UE 602. AMF 621 registers with UDM 628 and requests access and mobility subscription data, SMF selection data, and UE context SMF data from UDM 628. UDM 628 accesses the subscriber profile for UE 602 stored by UDR 629 and returns the requested data to AMF 621. AMF 621 creates UE context using the received data. The UE context comprises information like QoS metrics, slice selection information, S-NSSAIs, subscribed service features, PDU session information, and the like. For example, the S-NS-SAIs and slice selection information may indicate UE 602 only qualifies for a minimum QoS IoT slice.

Since UE 602 is not whitelisted for PCF registration, AMF 621 forgoes registering with PCF 627. Advantageously, AMF 621 and EIR 630 screen for devices that lack the capability to implement network rules provided by PCF 627. For example, certain device types (e.g., IoT UE lack the capability to implement network rules like URSP. By screening for these devices based on IMEI TACs, AMF 621 and EIR 630 reduce the signaling load on the N15 interface between AMF 621 and PCF 627 and inhibit unnecessary PCF registration for devices that lack the capabilities to support PCF registration. The reduced signaling load enhances the operation of PCF 627.

Once AMF 621 determines PCF registration is not available for IoT UE 602, AMF 621 selects NSSF 625 to select network slices for UE 602. AMF 621 indicates the network slices requested by UE 602 in the registration request and the slice selection information retrieved in the UE context to NSSF 625. NSSF 625 uses the selection information and slice requests to select a set of network slices for UE 602 and returns slice IDs for the selected slices to AMF 621. For example, NSSF 625 may select an IoT device slice for UE 602.

AMF 621 selects SMF 622 to serve UE 602 based on the SMF selection data, slice IDs, QoS metrics, requested PDU sessions, service attributes, and/or other data retrieved UDM 628 or received in the registration request from UE 602. SMF 622 directs ones of UPFs 623 that correspond to the slice IDs to serve UE 602 and indicates the network addresses for the ones of UPFs 623 to AMF 621. AMF 621 includes the slice IDs returned by NSSF 625 and the network addresses for the UPFs selected by SMF 622 in the UE context. It should be noted that AMF 621 does not include any network polices received from PCF 627 in the context for UE 602 since PCF registration did not occur for UE 602. AMF 621 transfers a registration accept message comprising the UE context for UE 602 to UE 602 over N3IWF 624 and access node 614. UE 602 stores the UE context in memory.

UE 602 uses the UE context to initiate a PDU session with network core 620. For example, UE 602 may begin an IoT PDU session over an IoT network slice. UE 602 generates uplink user data for its PDU sessions and transfers the uplink data to access node 614. Access node 614 transfers the uplink user data to the ones UPFs 623 that compose the selected network slices of UE 602 over N3IWF 624. The ones of UPFs 623 transfer the uplink data to data network 641. Data network 641 generates downlink data for the PDU session and transfers the downlink data to the ones of UPFs 623. The ones of UPFs 623 transfer the downlink data to access node 614 over N3IWF 624. Access node 614 transfers the downlink data to UE 602.

In some examples, AMF 621 instead hosts the IMEI TAC whitelist to qualify device types for PCF registration. For example, AMF 621 may receive an authentication response from a UE (e.g., UE 601 or 602) and match the authentication response with the expected result to register the UE for data services. AMF 621 requests the IMEI from the UE. The UE retrieves its IMEI from memory and indicates its IMEI to AMF 621 over RAN 610. AMF 621 transfers an equipment identity check request comprising the IMEI to EIR 630. Since AMF 621 hosts the IMEI TAC whitelist, AMF 621 does not include the N15 registration parameter in the equipment identity check to trigger PCF registration qualification for the UE on EIR 630. EIR 630 determines if the UE is blacklisted on the network based on the IMEI and transfers a response indicating whether the UE is blacklisted to AMF 621. AMF 621 receives the response from EIR 630 indicating if the UE is blacklisted. When the UE is authorized to be on the network, AMF 621 reads the first eight digits of the IMEI to determine the TAC for UE 601. AMF 621 compares the TAC for UE 601 to the whitelist. AMF 621 determines when the TAC for UE 601 is whitelisted for PCF registration and determines if UE 601 qualifies for access and mobility policy PCF registration, UE policy PCF registration, or both.

In some examples, the PCF registration whitelist hosted by AMF 621 and/or EIR 630 may instead comprise a blacklist. For example, AMF 621 and/or EIR 630 may host a blacklist indicating a range of TACs that do not qualify for PCF registration.

Figure 7:
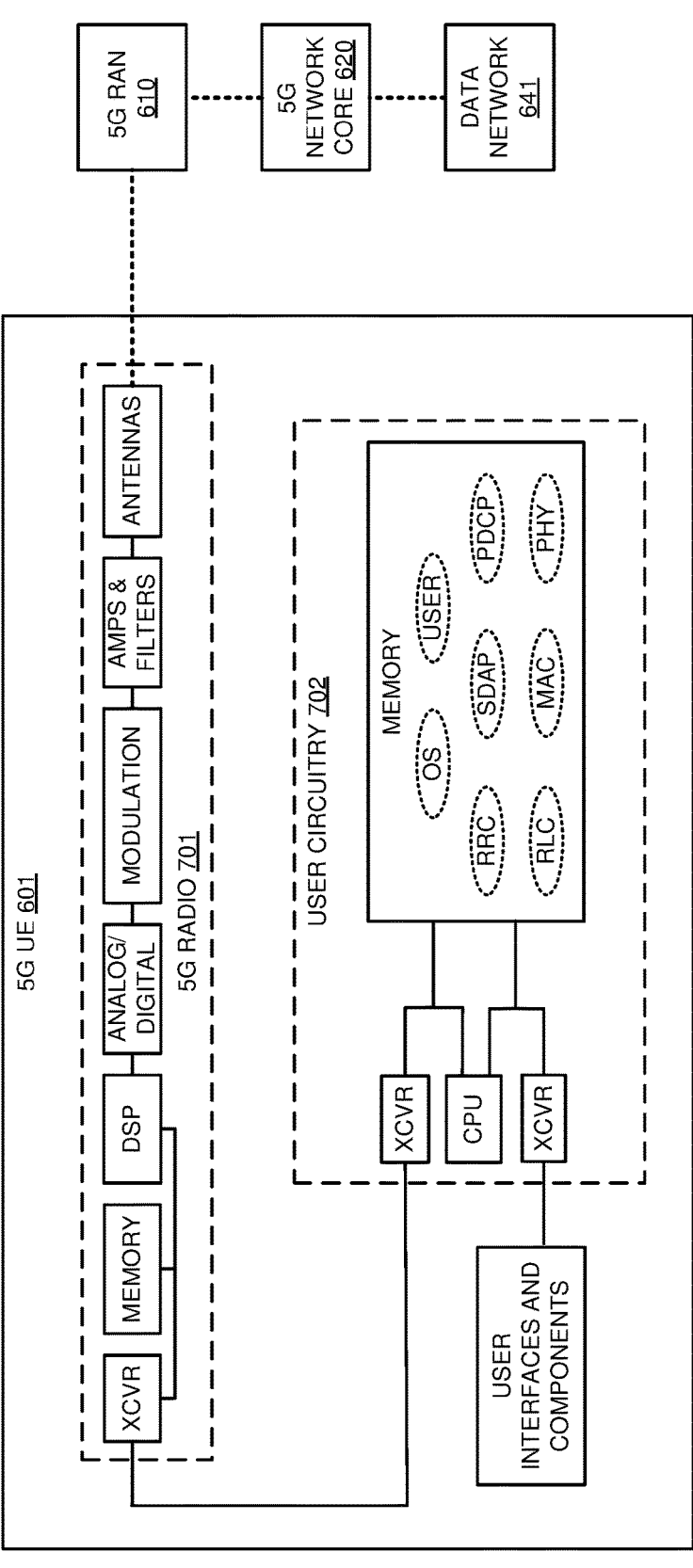
FIG. 7 illustrates a 5G UE in the 5G communication network.

FIG. 7 illustrates 5G UE 601 in 5G communication network 600. UE 601 comprises an example of user devices 101 illustrated in FIG. 1 and UE 301 illustrated in FIG. 3, however user devices 101 and UE 301 may differ. UE 601 comprises 5G radio 701 and user circuitry 702. Radio 701 comprises antennas, amplifiers, filters, modulation, analog-to-digital interfaces, Digital Signal Processers (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 701 is wirelessly coupled to 5G RAN 610 over 5GNR links. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 8:
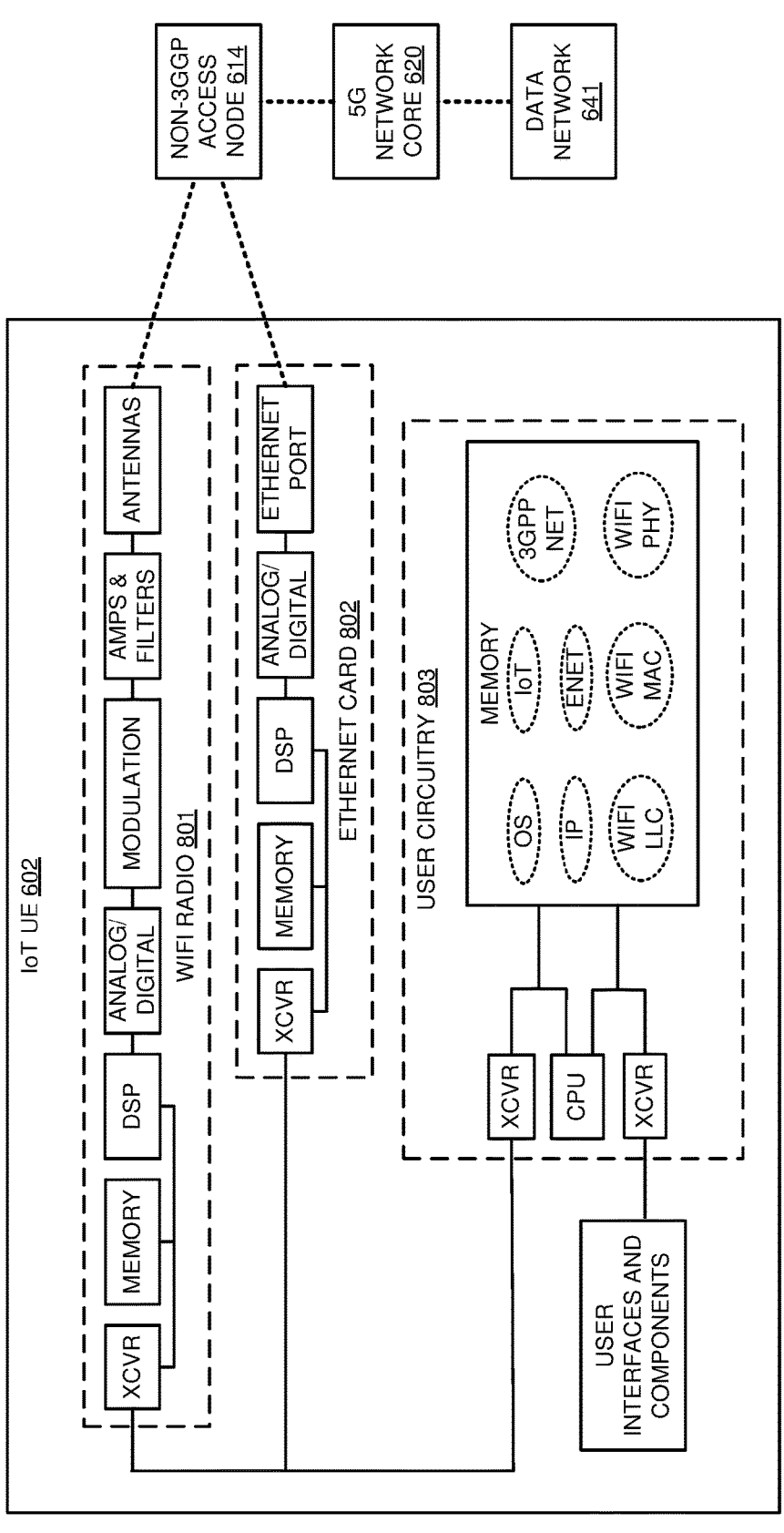
FIG. 8 illustrates an Internet-of-Things (IoT) UE in the 5G communication network.

FIG. 8 illustrates IoT UE 602 in 5G communication network 600. UE 602 comprises an example of user devices 101 illustrated in FIG. 1 and UE 301 illustrated in FIG. 3, however user devices 101 and UE 301 may differ. UE 602 comprises WIFI radio 801, ethernet card 802, and user circuitry 803. WIFI radio 801 comprises antennas, amplifiers, filters, modulation, analog-to-digital interfaces, DSP, memory, and transceivers that are coupled over bus circuitry. Ethernet card 802 comprises an ethernet port, analog-to-digital interfaces, DSP, memory, and transceivers that are coupled over bus circuitry. User circuitry 803 comprises memory, CPU, user interfaces and components, and transceivers (XCVRs) that are coupled over bus circuitry. The memory in user circuitry 803 stores an operating system (OS), IoT applications (IoT), and network applications like Internet Protocol (IP), WIFI Physical Layer (WIFI PHY), WIFI Media Access Control (WIFI MAC), WIFI Logical Link Control (WIFI LLC), and 3GPP Networking (3GPP NET).

The antennas in WIFI radio 801 are wirelessly coupled to non-3GPP access node 614 over a non-3GPP wireless link. Transceivers in WIFI radio 801 are coupled to transceivers in user circuitry 803. The ethernet port in ethernet card is coupled to non-3GPP access node 614 over a non-3GPP wireline link. Transceivers in ethernet card 802 are coupled to transceivers in user circuitry 803. The transceivers in user circuitry 803 are coupled to user components like displays, controllers, and memory. The CPU in user circuitry 803 executes the operating system, IoT applications, WIFI network applications, and ENET network applications to authenticate over and exchange data with non-3GPP access node 614 over WIFI radio 801 and/or ethernet card 802.

In some examples, the WIFI components of UE 602 may be omitted, and UE 602 may instead comprise an ENET only device. For example, if UE 602 comprises an ENET device, UE 602 would comprise ENET card 802 and the ENET networking application while WIFI radio 801 and the WIFI networking applications would be absent. In some examples, the ENET components of UE 602 may be omitted, and UE 602 may instead comprise a WIFI only device. For example, if UE 602 comprises a WIFI device, UE 602 would comprise WIFI radio 801 and the WIFI networking application while ethernet card 802 and the ENET networking applications would be absent. In other examples, UE 602 could also use other non-3GPP protocols like bluetooth, NB-IoT, and the like.

Figure 9:
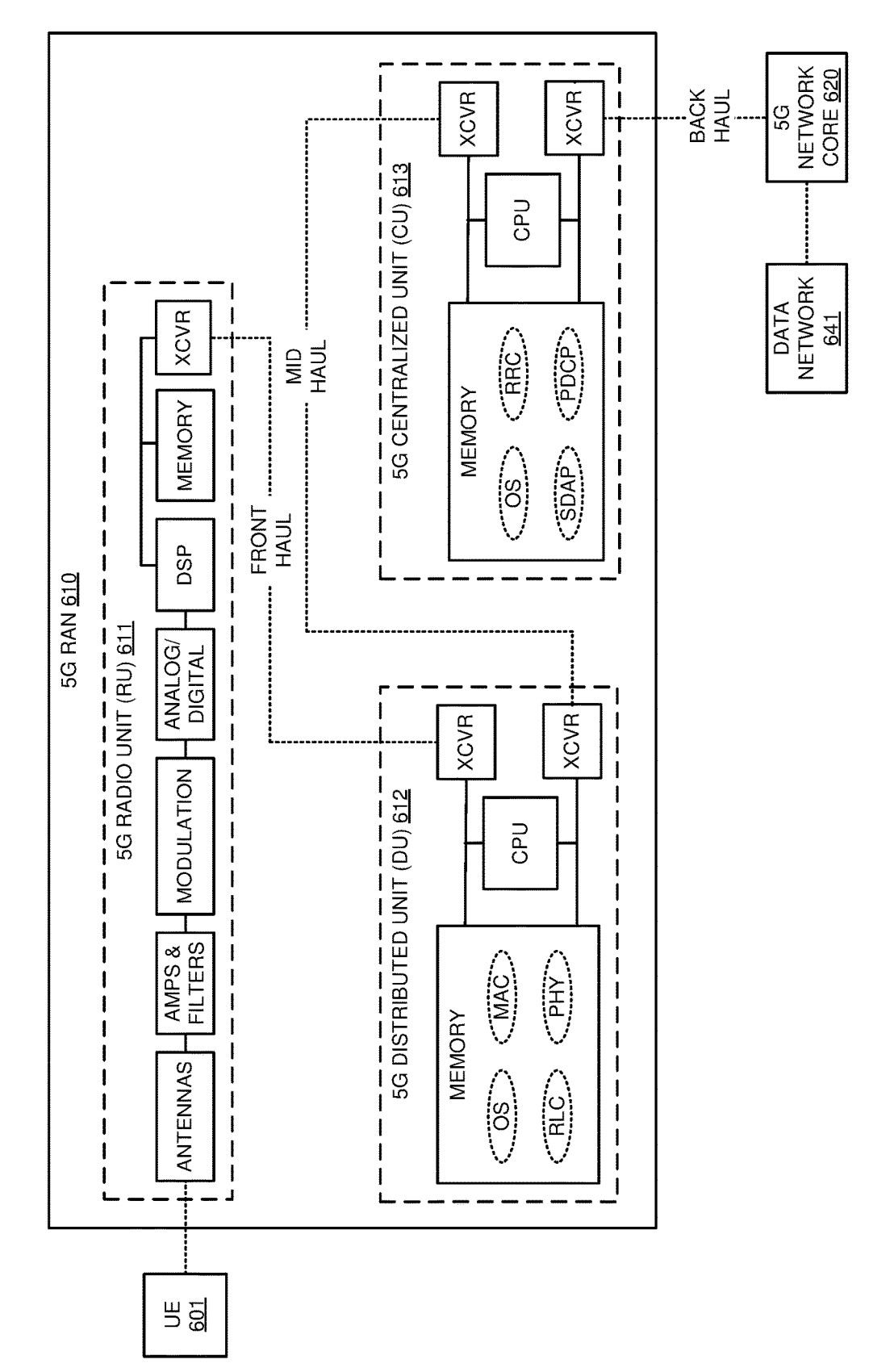
FIG. 9 illustrates a 5G Radio Access Network (RAN) in the 5G wireless communication network.

FIG. 9 illustrates 5G RAN 610 in 5G communication network 600. 5G RAN 610 comprises 5G Radio Unit (RU) 601, 5G Distributed Unit (DU) 602, and 5G Centralized Unit (CU) 603. RAN 610 comprises an example of access network 111 illustrated in FIG. 1 and RAN 311 illustrated in FIG. 3, however access network 111 and RAN 311 may differ.

RU 601 comprises antennas, amplifiers, filters, modulation, analog-to-digital interfaces, DSP, memory, and transceivers (XCVRs) that are coupled over bus circuitry. UE 601 is wirelessly coupled to the antennas in RU 601 over 5GNR links. Transceivers in 5G RU 601 are coupled to transceivers in 5G DU 602 over fronthaul links like enhanced Common Public Radio Interface (eCPRI). The DSPs in RU 601 executes their operating systems and radio applications to exchange 5GNR signals with UE 601 and to exchange 5GNR data with DU 602.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 602 over the transceivers.

For the downlink, the DSPs receive downlink 5GNR symbols from DU 602. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 602 comprises memory, CPU, and transceivers that are coupled over bus circuitry. The memory in 5G DU 602 stores operating systems and 5GNR network applications like PHY, MAC, and RLC. CU 603 comprises memory, CPU, and transceivers that are coupled over bus circuitry. The memory in CU 603 stores an operating system, 5GNR network applications like PDCP, SDAP, and RRC. Transceivers in 5G DU 602 are coupled to transceivers in RU 601 over front-haul links. Transceivers in DU 602 are coupled to transceivers in CU 603 over mid-haul links. A transceiver in CU 603 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 10:
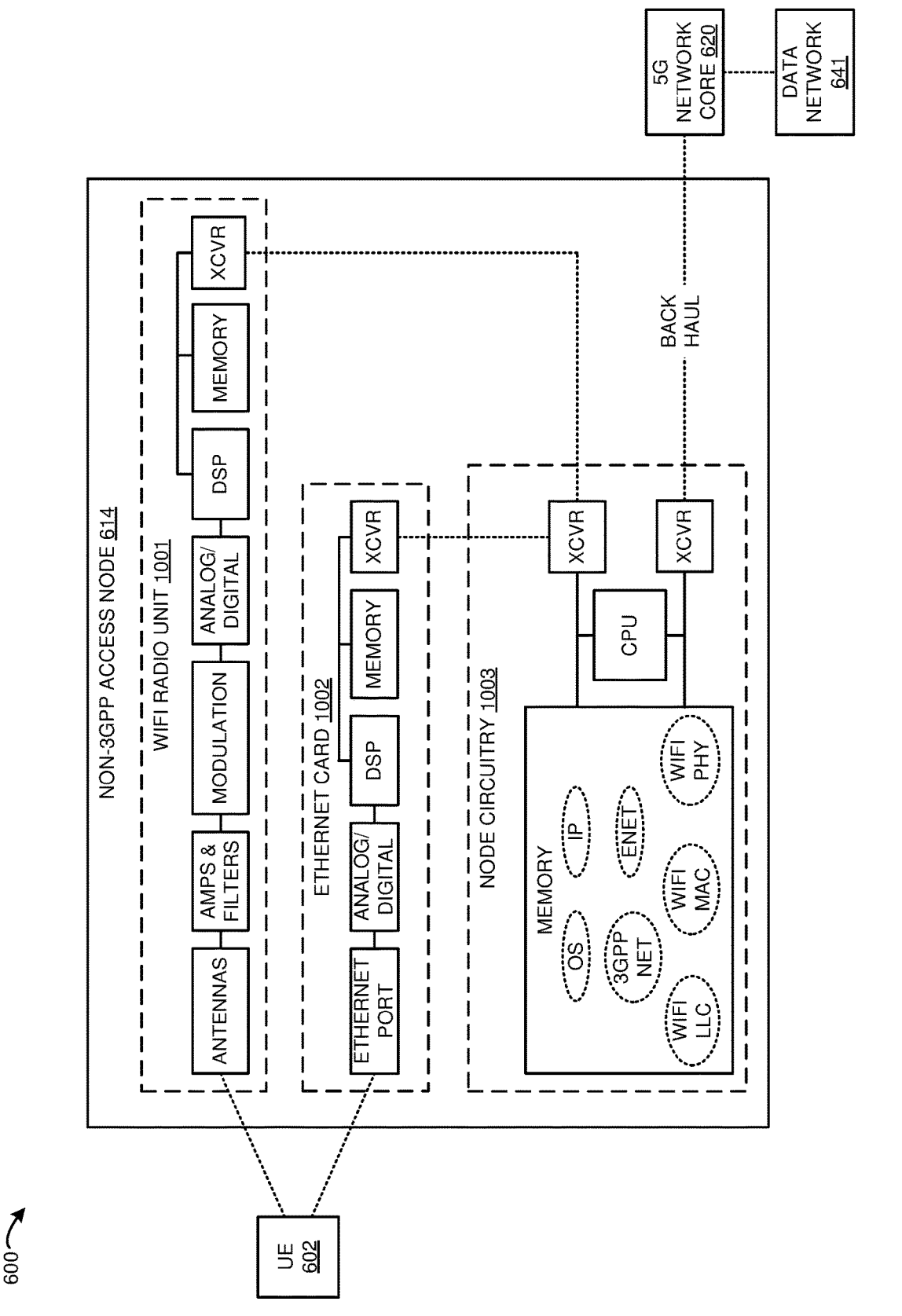
FIG. 10 illustrates a non-Third Generation Partnership Project (3GPP) access node in the 5G wireless communication network.

FIG. 10 illustrates non-3GPP access node 614 in 5G communication network 600. Access node 614 comprises an example of access network 111 illustrated in FIG. 1 and RAN 311 illustrated in FIG. 3, however access network 111 and RAN 311 may differ. Non-3GPP access node 614 comprises WIFI radio 1001, ethernet card 1002, and node circuitry 1003. Non-3GPP access node 614 may comprise a trusted access node or an untrusted access node. WIFI radio 1001 comprises antennas, amplifiers, filters, modulation, analog-to-digital interfaces, DSP, memory, and transceivers that are coupled over bus circuitry. Ethernet card 1002 comprises an ethernet port, analog-to-digital interfaces, DSP, memory, and transceivers that are coupled over bus circuitry. Node circuitry 1003 comprises memory, CPU, and transceivers that are coupled over bus circuitry. The memory in node circuitry 1003 stores operating systems (OS), and network applications like WIFI PHY, WIFI MAC, WIFI LLC, IP, ENET and 3GPP NET. Other wireless protocols like bluetooth and narrowband internet-of-things could be used.

The antennas in WIFI radio 1001 are wirelessly coupled to UE 602 over non-3GPP wireless links. Transceivers in WIFI radio 1001 are coupled to transceivers in node circuitry 1003. The ethernet port in ethernet card 1002 is coupled to UE 602 over a non-3GPP wireline link. Transceivers in ethernet card 1002 are coupled to transceivers in node circuitry 1003. Transceivers in node circuitry 1003 are coupled to transceivers in N3IWF 624 over backhaul links. The CPU in node circuitry 1003 executes the operating system and network applications to exchange data and authentication signaling with UE 602.

Figure 11:
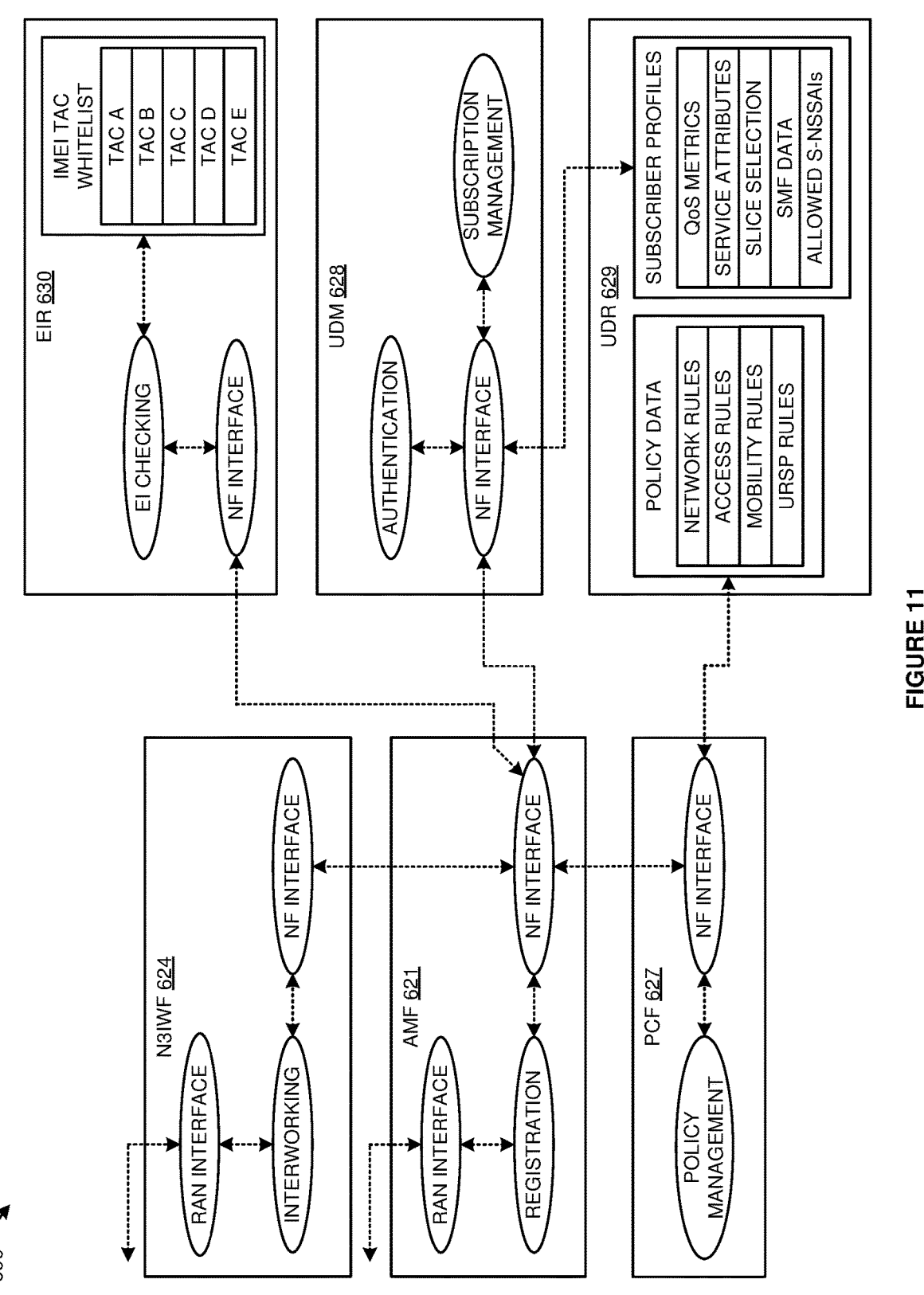
FIG. 11 illustrates network functions in the 5G wireless communication network.

FIG. 11 illustrates AMF 621, N3IWF 624, PCF 627, UDM 628, UDR 629, and EIR 630 in 5G wireless communication network 600. AMF 621 comprises modules for UE registration, network function (NF) interfacing, and RAN interfacing. The registration module generates and exchanges registration signaling with UEs 601 and 602 like authentication challenges and confirms authentication responses received from UEs 601 and 602. N3IWF 624 comprises modules for 3GPP interworking, network function interfacing, and RAN interfacing. The interworking module translates signaling between non-3GPP signaling interpretable by access node 614 and 5GC signaling interpretable by the network functions resident in core 620. PCF 627 comprises modules for policy management and network function interfacing. The policy management module provides network policies like URSP rules to AMF 621 in response to PCF registration. UDM 628 comprises modules for user subscription management, UE authentication, and network function interfacing. The authentication module generates authentication challenges for AMF 621 to authenticate UEs 601 and 602. The subscription management module provides subscriber data to AMF 621 to for UE context. UDR 629 stores policy data and subscriber profiles. The policy data includes information like network rules, policy enforcement rules, and URSP rules. The subscriber profiles are associated with UEs (e.g., UE 601 and 602) and include information like QoS metrics, service attributes, slice selection data, SMF data, and allowed S-NSSAIs. EIR 630 comprises an equipment identity (EI) checking module and the IMEI TAC whitelist. The equipment identity checking module determines if the UE is blacklisted from the network and interfaces with the IMEI TAC whitelist to determine PCF registration eligibility for the UE. The interfacing modules allow AMF 621, N3IWF 624, PCF 627, UDM 628, UDR 629, and EIR 630 to exchange signaling with each other, the other network functions in 5G core 620, and with external systems like RAN 610 and access node 614.

As illustrated in FIG. 11, lists TACs A-E which are eligible for PCF registration. TACs not listed by the whitelist are not eligible for PCF registration. The whitelist may comprise additional information qualifying the PCF registration types available for TACs A-E. For example, the IMEI TAC whitelist may indicate TACs A-C qualify for both access and mobility policy registration and UE policy registration, TAC D only qualifies for access and mobility policy registration, and TAC E only qualifies UE policy registration. It should be appreciated that the TACs A-E are exemplary and typically comprise eight-digit alphanumeric codes. In other examples, the IMEI TAC whitelist may comprise many more TACs than is illustrated in FIG. 11.

In some examples, the RAN interface module in AMF 621 receives a registration request sent by UE 601 and notifies the registration module. The registration module interfaces with the authentication module in UDM 628 to generate an authentication challenge for UE 601. The registration module delivers the challenge to UE 601 over the RAN interface module and subsequently receives an authentication response. Upon successfully registering UE 601, the registration module transfers an IMEI request for UE 601 over the RAN interface. Subsequently, the registration module receives an IMEI indication generated by UE 601 over the RAN interface. The registration module transfers an equipment check request to the equipment identity checking module in EIR 630. The request comprises the IMEI for UE 601 and an N15 parameter to trigger PCF registration qualification for UE 601. The equipment checking module reads the TAC for UE 601 from the IMEI and compares the TAC for UE 601 to the IMEI TAC whitelist. The equipment checking module determines UE 601 is eligible for UE policy PCF registration and access and mobility policy PCF registration and indicates the eligibility to the registration module in AMF 621.

The registration module interfaces with the subscription management module in UDM 628 to generate context for UE 601. The subscription management module accesses the subscriber profile for UE 601 in UDR 629 and returns the subscriber data to the registration module. The registration module forms UE context for UE 601 using the data received from UDM 628. Since the device type for UE 601 qualifies for PCF registration, the registration module registers UE 601 with the policy management module in PCF 627. The policy management module accesses the network policy data stored in UDR 629 and returns the network rules, access rules, mobility rules, and URSP rules for UE 601 to the registration module. The registration module includes the data received from PCF 627 in the UE context and transfers the UE context for delivery to UE 601 over the RAN interface.

The RAN interface module in N3IWF 624 receives a registration request sent by UE 602. The interworking module translates the non-3GPP signaling into 5GC signaling and delivers the registration request to the registration module in AMF 621. The registration module interfaces with the authentication module in UDM 628 to generate an authentication challenge for UE 602. The registration module returns the challenge to the interworking module in N3IWF 624. The interworking module translates the 5GC signaling into non-3GPP signaling and transfers the challenge for delivery to UE 602 over the RAN interface. The RAN interface module in N3IWF 624 subsequently receives an authentication response generated by UE 602. The interworking module translates the response and delivers the response to the registration module in AMF 621.

Upon successfully registering UE 602, the registration module transfers an IMEI request for UE 602 to the interworking module over their network function interfaces. The interworking module translates the IMEI request into non-3GPP signaling and translates the request over the RAN interface. Subsequently, the interworking module receives an IMEI indication for UE 602 over the RAN interface. The interworking module translates the non-3GPP signaling into 5GC signaling and delivers the registration request to the registration module in AMF 621. The registration module transfers an equipment check request to the equipment identity checking module in EIR 630. The request comprises the IMEI for UE 602 and an N15 parameter to trigger PCF registration qualification for UE 602. The equipment checking module reads the TAC for UE 602 from the IMEI and compares the TAC for UE 602 to the IMEI TAC whitelist. The equipment checking module determines UE 602 is ineligible for PCF registration and indicates the ineligibility to the registration module in AMF 621.

The registration module interfaces with the subscription management module in UDM 628 to generate context for UE 602. The subscription management module accesses the subscriber profile for UE 602 in UDR 629 and returns the subscriber data to the registration module. The registration module forms UE context for UE 602 and transfers the UE context for delivery to the interworking module in N3IWF 624. The interworking module translates the UE context and transfers the UE context for delivery to UE 602 over the RAN interface. Since UE 602 is not qualified for PCF registration, the registration module in AMF 621 skips PCF registration for UE 602.

Figure 12:
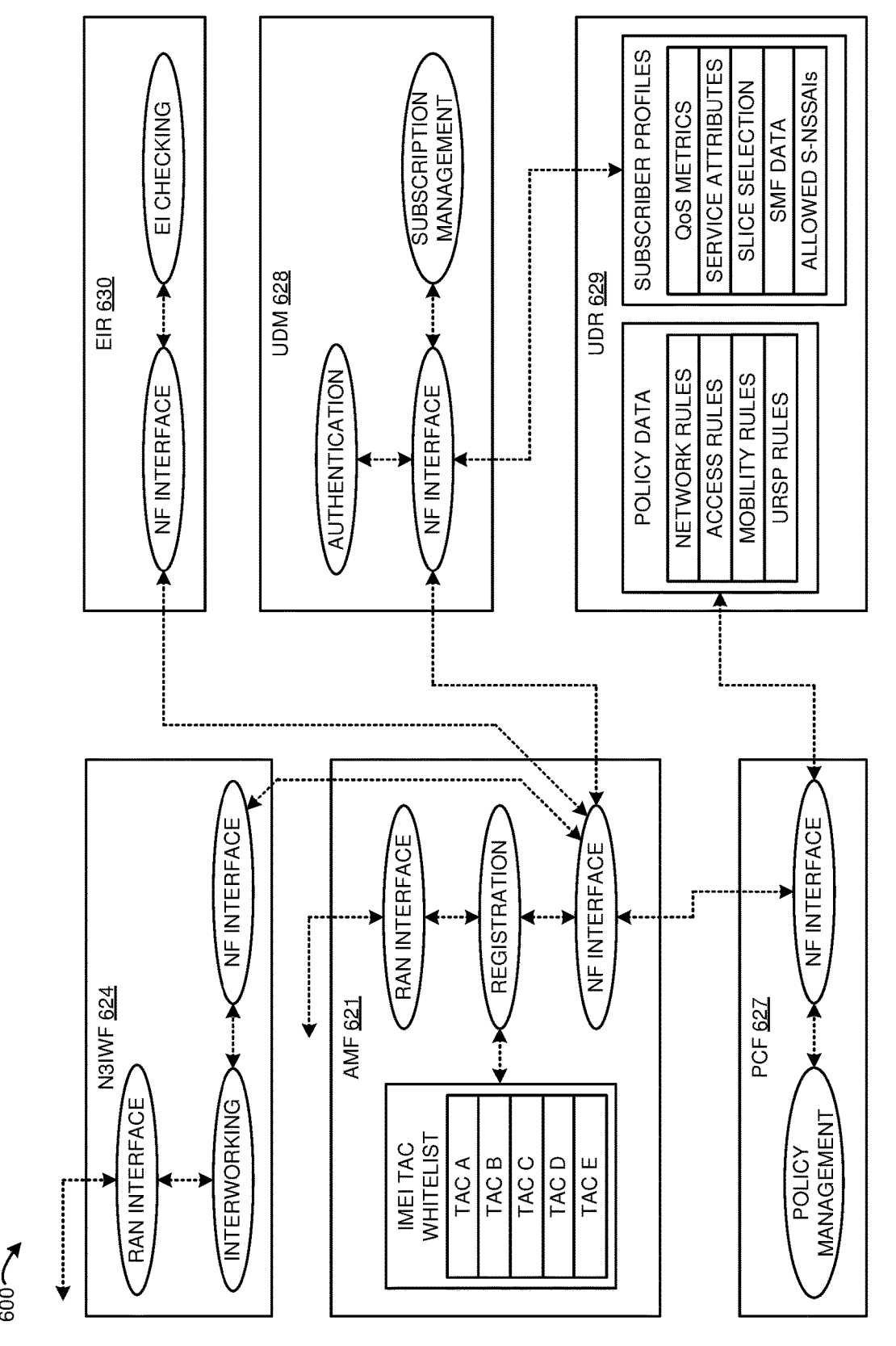
FIG. 12 illustrates further illustrations the network functions in the 5G wireless communication network.

FIG. 12 illustrates AMF 621, N3IWF 624, PCF 627, UDM 628, UDR 629, and EIR 630 in 5G wireless communication network 600. The network functions illustrated in FIG. 12 comprise a similar architecture to those illustrated in FIG. 11. In this example, AMF 621 instead comprises the IMEI TAC whitelist. The IMEI TAC whitelist hosted by AMF 621 is an example of the IMEI TAC whitelist hosted by EIR 630 illustrated in FIG. 11.

In some examples, the registration module in AMF 621 receives a registration request sent for UE 601 and interfaces with UDM 628 to register UE 601 as described in FIG. 11. Upon successfully registering UE 601, the registration module transfers an IMEI request for UE 601 over the RAN interface. Subsequently, the registration module receives an IMEI indication generated by UE 601 over the RAN interface. The registration module interfaces with the equipment identity checking module in EIR 630 to authorize UE 601 for network access. The registration module reads the TAC for UE 601 from the IMEI and compares the TAC for UE 601 to the IMEI TAC whitelist. The registration module determines UE 601 is eligible for UE policy PCF registration and access and mobility policy PCF registration. The registration module interfaces with PCF 627 and UDM 628 as described in FIG. 11 to register UE 601 with PCF 627 and deliver the UE context to UE 601.

The registration module in AMF 621 receives a registration request sent for UE 602 over N3IWF 624 and interfaces with UDM 628 to register UE 601 as described in FIG. 11. Upon successfully registering UE 602, the registration module transfers an IMEI request for UE 602 over N3IWF 624. Subsequently, the registration module receives an IMEI indication generated by UE 602 and interfaces to authorize UE 602 for network access. The registration module reads the TAC for UE 602 and compares the TAC to the IMEI TAC whitelist. The registration module determines the device type of UE 602 does not qualify for PCF registration. The registration module forgoes PCF registration for UE 602 based on the indication and interfaces UDM 628 and N3IWF 624 as described in FIG. 11 to deliver the UE context to UE 602.

Figure 13:
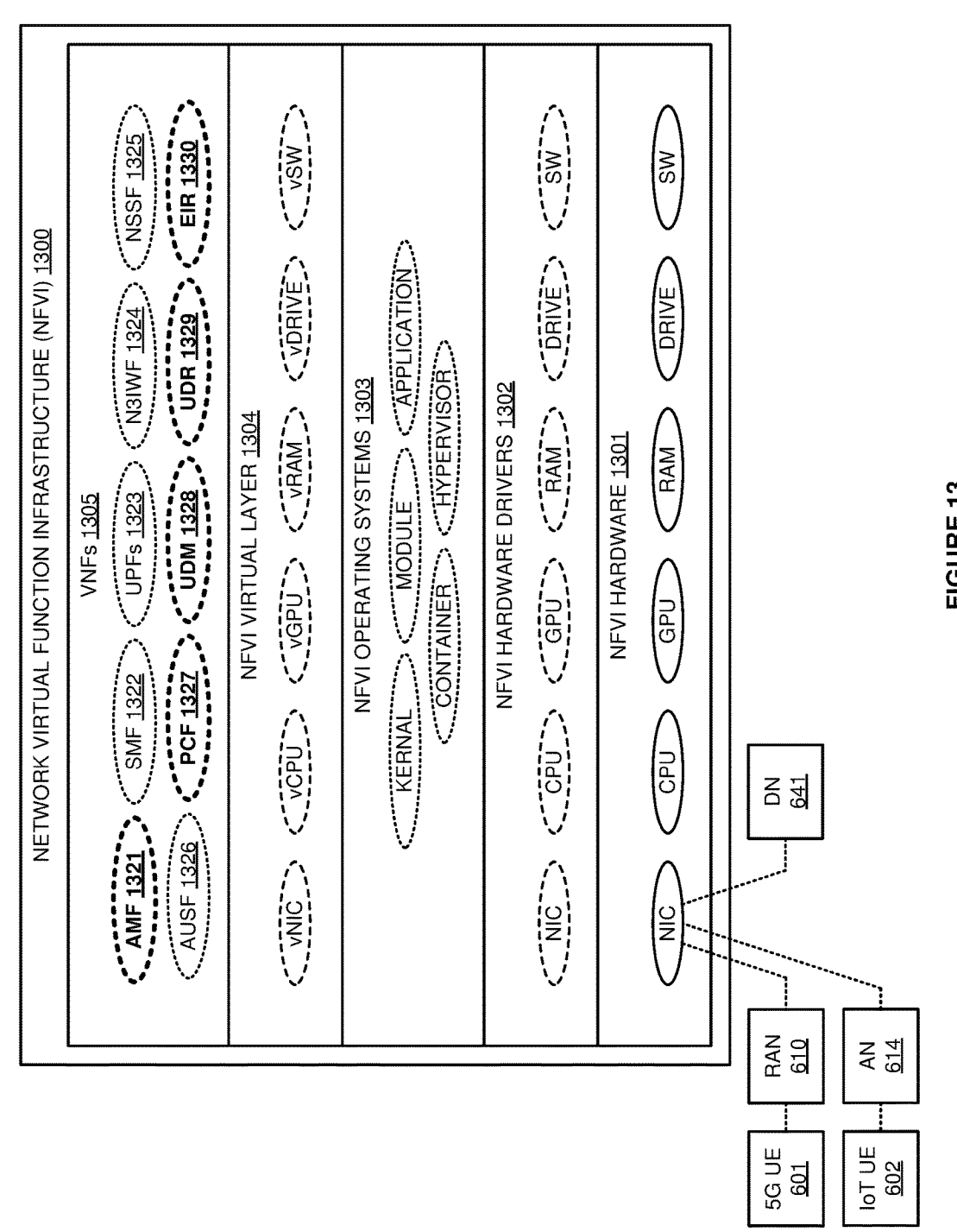
FIG. 13 illustrates a Network Function Virtualization Infrastructure (NFVI) in the 5G wireless communication network.

FIG. 13 illustrates Network Function Virtualization Infrastructure (NFVI) 1300 in 5G wireless communication network 600. NFVI 1300 comprises an example of core network 121 illustrated in FIG. 1 and network circuitry 320 illustrated in FIG. 3, although core network 121 and network circuitry 320 may differ. NFVI 1300 comprises NFVI hardware 1301, NFVI hardware drivers 1302, NFVI operating systems 1303, NFVI virtual layer 1304, and NFVI Virtual Network Functions (VNFs) 1305. NFVI hardware 1301 comprises Network Interface Cards (NICs), CPU, GPU, RAM, Flash/Disk Drives (DRIVE), and Data Switches (SW). NFVI hardware drivers 1302 comprise software that is resident in the NIC, CPU, GPU, RAM, DRIVE, and SW. NFVI operating systems 1303 comprise kernels, modules, applications, containers, hypervisors, and the like. NFVI virtual layer 1304 comprises vNIC, vCPU, vGPU, vRAM, vDRIVE, and vSW. NFVI VNFs 1305 comprise AMF 1321, SMF 1322, UPFs 1323, N3IWF 1324, NSSF 1325, AUSF 1326, PCF 1327, UDM 1328, UDR 1329, and EIR 1330. Additional VNFs and network elements like NRF, SCP, NEF, and AF are typically present but are omitted for clarity. NFVI 1300 may be located at a single site or be distributed across multiple geographic locations. The NIC in NFVI hardware 1301 is coupled to RAN 610, non-3GPP access node (AN) 614, and data network (DN) 641. NFVI hardware 1301 executes NFVI hardware drivers 1302, NFVI operating systems 1303, NFVI virtual layer 1304, and NFVI VNFs 1305 to form AMF 621, SMF 622, UPFs 623, N3IWF 624, NSSF 625, AUSF 626, PCF 627, UDM 628, UDR 629, and EIR 630.

Figure 14:
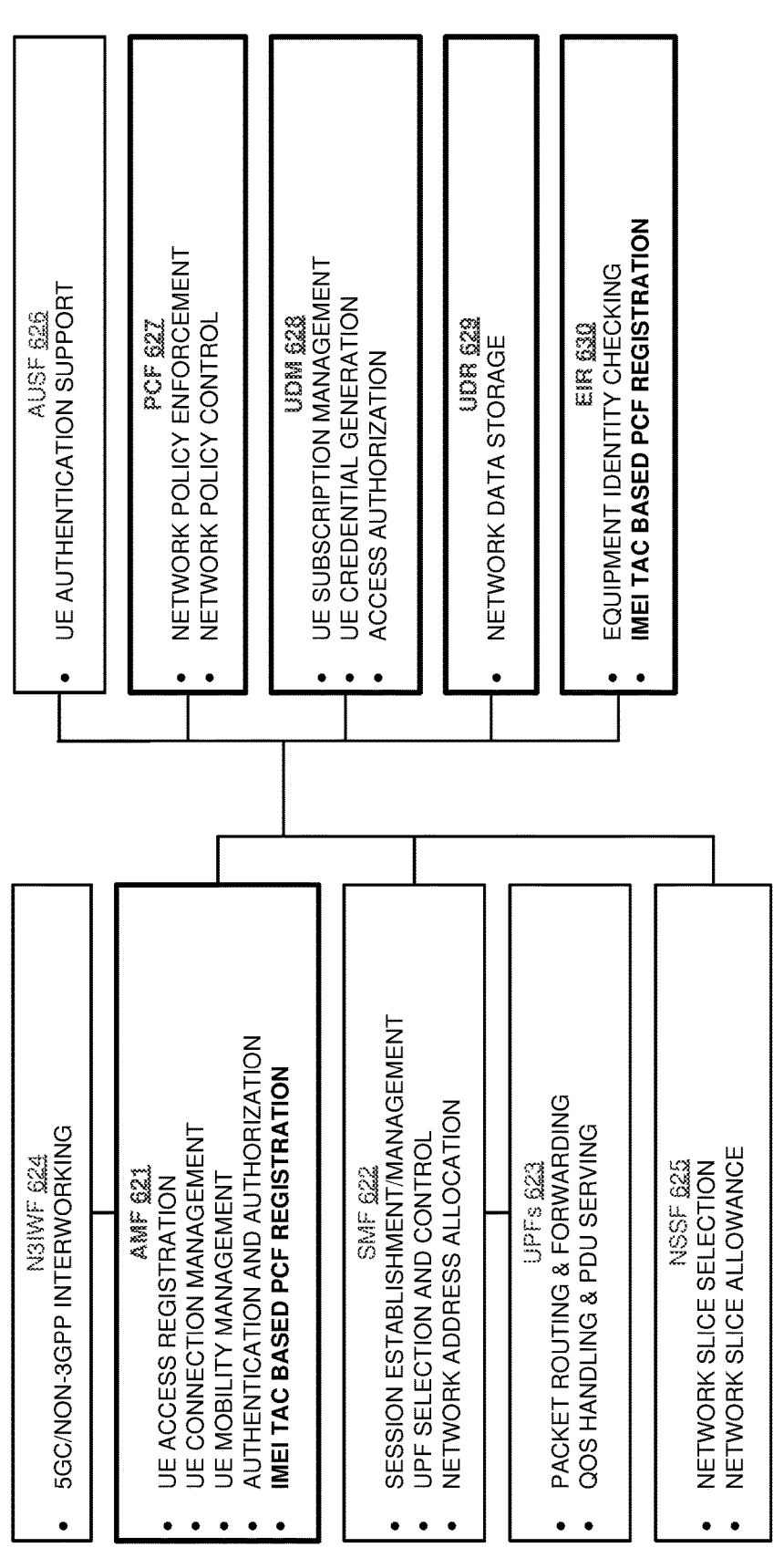
FIG. 14 further illustrates the NFVI in the 5G wireless communication network.

FIG. 14 further illustrates NFVI 1300 in 5G communication network 600. AMF 621 comprises capabilities for UE access registration, UE connection management, UE mobility management, UE authentication, UE authorization, and IMEI TAC based PCF registration. SMF 622 comprises capabilities for session establishment, session management, UPF selection/control, and network address allocation.

UPFs 623 comprise capabilities for packet routing, packet forwarding, QoS handling, and PDU serving. N3IWF 624 comprises capabilities for 5GC/non-3GPP interworking. NSSF 625 comprises capabilities for network slice selection and network slice allowance. AUSF 626 comprises capabilities for UE authentication support. PCF 627 comprises capabilities for network policy enforcement and network policy control. UDM 628 comprises capabilities for UE subscription management, UE credential generation, and UE access authorization. UDR 629 comprises capabilities for network data storage. EIR 630 comprises capabilities for equipment identity checking and IMEI TAC based PCF registration.

In some examples, AMF 621 receives a registration request generated by UE 601 that indicates registration type, UE capabilities, requested slice types, and PDU session requests. In response to the registration request, AMF 621 transfers an identity request for delivery to UE 601. AMF 621 receives an identity indication comprising the SUCI for UE 601 and selects AUSF 626 to authenticate UE 601. AMF 621 transfers an authentication request comprising the SUCI to AUSF 626. AUSF 626 retrieves authentication vectors and the SUPI for UE 601 from UDM 628. AUSF 626 returns the SUPI and authentication vectors to AMF 621. AMF 621 indicates the authentication type and transfers the authentication vectors for delivery to UE 601. AMF 621 receives an authentication response generated by UE 601. AMF 621 matches the authentication response to an expected result and responsively registers UE 601.

In this example, the PCF registration whitelist is hosted by EIR 630. AMF 621 requests the IMEI from UE 601 and subsequently receives an IMEI indication from UE 601. AMF 621 transfers an equipment identity check request comprising the IMEI to EIR 630. EIR 630 compares the IMEI to a network wide blacklist and determines UE 601 is not blacklisted on network core 620. EIR 630 reads TAC for UE 601 in the IMEI and compares the TAC for the UE to a PCF registration TAC whitelist. EIR 630 identifies that the TAC for UE 601 is whitelisted for access and mobility policy PCF registration and UE policy PCF registration. EIR 630 transfers an EIR response to AMF 621 indicating that UE 601 is not blacklisted on network core 620 and that UE 601 qualifies for access and mobility policy PCF registration and UE policy PCF registration.

Responsive to the successful registration and equipment identity check, AMF 621 requests access and mobility subscription data, SMF selection data, and UE context SMF data from UDM 628. UDM 628 retrieves the requested data from UDR 629 and transfers data to AMF 621. AMF 621 creates UE context that comprises QoS metrics, slice selection information, S-NSSAIs, subscribed service features, PDU session information, and the like. Since UE 601 is whitelisted for PCF registration, AMF 621 registers UE 601 with PCF 627 for access and mobility policies and UE policies. PCF 627 responds to the registration by transferring access and mobility rules and URSP rules for UE 601 to AMF 621. AMF 621 interfaces with NSSF 625 to select network slices for UE 601. NSSF 625 selects network slices for UE 601 based on the slice request received from UE 601 and the slice selection information retrieved from UDM 628. NSSF 625 transfers the slices IDs for the selected slices to AMF 621. AMF 621 directs SMF 622 to serve UE 601. SMF 622 identifies ones of UPFs 623 that correspond to the slice IDs and controls these UPFs to serve UE 601. SMF 622 indicates the network addresses for these UPFs to AMF 621. AMF 621 includes the access and mobility rules and URSP rules, the slice IDs, and the network addresses for the UPFs in the UE context. AMF 621 transfers a registration accept message comprising the UE context for delivery to UE 601

In response to UE 601 initiating PDU data sessions, the ones of UPFs 623 that compose the network slices provisioned to UE 601 receive uplink data generated by UE 601. The ones of UPFs 623 transfer the uplink data to data network 641. The ones of UPFs 623 receive downlink data generated by data network 641 for the PDU session. The ones of UPFs 623 transfer the downlink data for delivery to UE 601.

Concurrently, AMF 621 receives a registration request from IoT UE 602. AMF 621 responds to the registration request by transferring an identity request to N3IWF 624. N3IWF 624 transfers the request for delivery to UE 602. N3IWF 624 receives an identity indication from UE 602 that comprises the IoT device ID for UE 602 and forwards the indication to AMF 621. AMF 621 transfers an authentication request comprising the IoT device ID to AUSF 626. AUSF 626 retrieves authentication vectors the SUPI for UE 602 from UDM 628 and transfers the SUPI and authentication vectors to AMF 621. AMF 621 transfers the vectors to N3IWF 624 which forwards the vectors for delivery to UE 602. N3IWF 624 receives an authentication response generated by UE 602 and delivers the response to AMF 621. AMF 621 matches the expected result and authentication response and responsively registers UE 602 with network core 620.

AMF 621 requests the IMEI from UE 602 and subsequently receives an IMEI indication from UE 602. AMF 621 interfaces with EIR 630 to perform an equipment identity check for UE 602. EIR 630 compares the IMEI for UE 602 to a network wide blacklist and determines UE 602 is not blacklisted on network core 620. EIR 630 reads the TAC for UE 602 and compares the TAC to the PCF registration TAC whitelist. EIR 630 identifies that the TAC for UE 602 is not whitelisted for any type of PCF registration. EIR 630 transfers an EIR response to AMF 621 indicating that UE 602 is not blacklisted on network core 620 and that UE 602 does not qualify for PCF registration.

Responsive to the successful registration and equipment identity check, AMF 621 requests UE context data comprising QoS metrics, slice selection information, S-NSSAIs, subscribed service features, and PDU session information, from UDM 628. UDM 628 pulls the requested context data from UDR 629 and provides the UE context data to AMF 621. AMF 621 skips PCF registration for UE 602 based on the EIR response from EIR 630. AMF 621 interfaces with NSSF 625 to select network slices for UE 602 and interfaces with SMF 622 to select ones of UPFs 623 for UE 602. NSSF 625 indicates the slice IDs for the selected network slices to AMF 621 and SMF 622 indicates the network addresses for the selected UPFs to AMF 621. AMF 621 includes the slice IDs and the network addresses in the UE context. AMF 621 transfers the UE context for UE 602 to N3IWF 624. N3IWF 624 transfers the UE context for delivery to UE 602.

In response to UE 602 initiating an IoT data session, N3IWF 624 receives uplink IoT data generated by UE 602. N3IWF 624 forwards the uplink IoT data to the ones of UPFs 623 that compose the network slices provisioned to UE 602. The ones of UPFs 623 transfer the uplink IoT data to data network 641. The ones of UPFs 623 receive downlink IoT data generated by data network 641 for the IoT data session. The ones of UPFs 623 transfer the downlink IoT data to N3IWF 624. N3IWF 624 transfers the downlink IoT data for delivery to UE 601.

Figure 15:
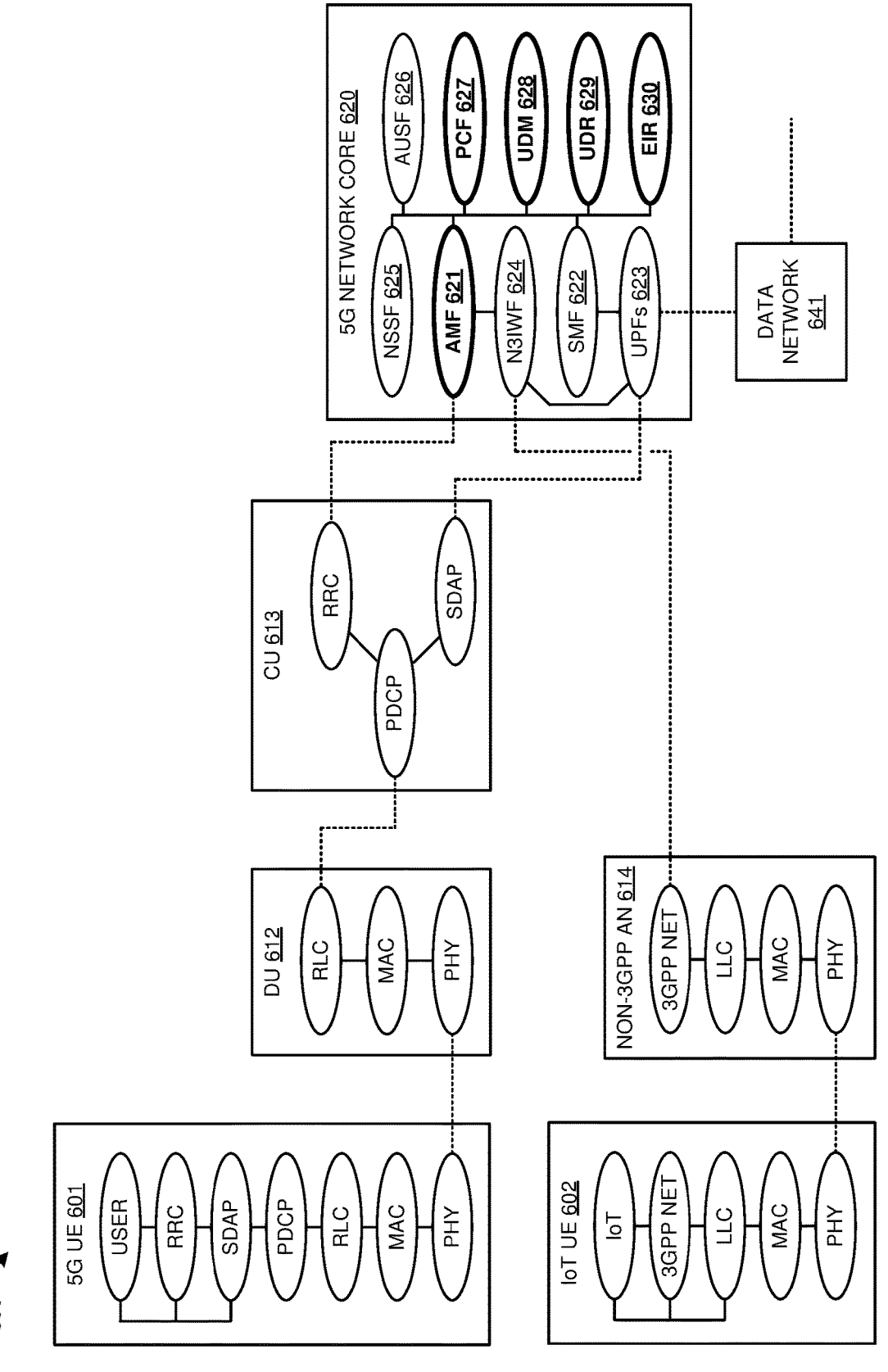
FIG. 15 illustrates an exemplary operation of the 5G wireless communication network to qualify the UE for PCF registration.

FIG. 15 illustrates an exemplary operation of 5G communication network 600 to qualify UE for PCF registration.

The operation may vary in other examples. In some examples, 5G UE 601 wirelessly attaches to CU 613 over RU 611 and DU 612. The RRC in UE 601 generates and transfers a registration request to the RRC in CU 613 over the PDCPs, RLCs, MACs, and PHYs. The RRC in CU 613 forwards the registration request to AMF 621. AMF 621 interacts with AUSF 626 and UDM 628 to authenticate UE 601 and register UE 601 for wireless data services.

Responsive the successful registration, AMF 621 transfers an IMEI request for UE 601 to the RRC in CU 613. The RRC in CU 613 forwards the IMEI request to the RRC in UE 601 over the PDCPs, RLCs, MACs, and PHYs. The RRC in UE 601 retrieves its IMEI from memory and transfers the IMEI to the RRC in CU 613 over the PDCPs, RLCs, MACs, and PHYs. The RRC in CU 613 forwards the IMEI for UE 601 to AMF 621. AMF 621 interfaces with EIR 630 to confirm that UE 601 is not blacklisted on the network and to qualify UE 601 for PCF registration. In this example, EIR 630 instead hosts a blacklist indicating TACs that do not qualify for PCF registration. EIR 630 compares the TAC for UE 601 to the PCF blacklist and determines that the TAC for UE 601 is not blacklisted for PCF registration. EIR 630 transfers a response to AMF 621 indicating that UE 601 is authorized to access the network and that UE 601 qualifies for PCF registration.

Responsive to the successful registration and equipment identity check, AMF 621 interfaces with UDM 628 to generate UE context for UE 601. UDM 628 retrieves the UE context data from UDR 629 and transfers the context data to AMF 621. The UE context data comprises QoS metrics, slice selection information, S-NSSAIs, subscribed service features, and PDU session information. Since UE 601 qualifies for PCF registration, AMF 621 registers UE 601 with PCF 627. PCF 627 responds to the registration by access rules, mobility rules, and URSP rules for UE 601 to AMF 621. AMF 621 interfaces with NSSF 625 to select network slices for UE 601. NSSF 625 indicates slices IDs for the selected network slices to AMF 621. AMF 621 interfaces with SMF 622 to select ones of UPFs 623 to serve UE 601. SMF 622 indicates the network addresses for the selected ones of UPFs 623 to AMF 621. AMF 621 includes the access rules, mobility rules, and URSP rules received from PCF 627, the slice IDs received from NSSF 625, and the network addresses received from SMF 622 in the UE context. AMF 621 transfers a registration accept message that comprises the UE context to the RRC in CU 613. The RRC in CU 613 transfers the registration accept message to the RRC in UE 601 over the PDCPs, RLCs, MACs, and PHYs. The RRC in UE 601 stores the UE context in memory.

A user application in UE 601 executes initiating a low-latency PDU session. The RRC detects the execution and directs the SDAP in UE 601 to support the low-latency PDU session. The user application generates uplink user data for the low-latency PDU session. The SDAP uses the URSP rules provided by PCF 627 to route the low-latency uplink user data to the appropriate network slice. The SDAP in UE 601 addresses the uplink user data based on the mappings provided in the URSP rules and transfers the uplink user data to the SDAP in CU 613 over the PDCPs, RLCs, MACs, and PHYs. The SDAP in CU 613 transfers the uplink user data to the one of UPFs 623 that composes the low-latency network slice provisioned to UE 601. The one of the UPFs 623 transfers the uplink low-latency user data to data network 641. Data network 641 generates downlink data for the low-latency PDU session and transfers the downlink data to the one of UPFs 623. The one of UPFs 623 transfers the downlink data to the SDAP in CU 613. The SDAP in CU 613 wirelessly transfers the downlink data to the SDAP in UE 601 over the PDCPs, RLCs, MACs, and PHYs.

Concurrently, IoT UE 602 wirelessly attaches to non-3GPP access node 614. The 3GPP NET in UE 602 transfers a registration request to the 3GPP NET in access node 614 over the LLCs, MACs, and PHYs. The 3GPP NET in access node 614 forwards the registration request to AMF 621 over N3IWF 624. AMF 621 receives the registration request. AMF 621 interfaces with AUSF 626 and UDM 628 to authenticate UE 602 and register UE 602 for service on network core 620. Responsive the successful registration, AMF 621 transfers an IMEI request for UE 602 to the 3GPP NET in access node 614 over N3IWF 624. The 3GPP NET in access node 614 forwards the IMEI request to the 3GPP NET in UE 602 over the LLCs, MACs, and PHYs. The 3GPP NET in UE 602 retrieves its IMEI from memory and transfers the IMEI to the 3GPP NET in access node 614 over the LLCs, MACs, and PHYs. The 3GPP NET in CU 613 delivers IMEI for UE 602 to AMF 621 over N3IWF 624. AMF 621 interfaces with EIR 630 to confirm that UE 602 is not blacklisted on the network and to qualify UE 602 for PCF registration. EIR 630 compares the TAC for UE 602 to the PCF blacklist and determines that the TAC for UE 602 is blacklisted for PCF registration. EIR 630 transfers a response to AMF 621 indicating that UE 602 is authorized to access the network and that UE 602 is blacklisted for PCF registration.

Responsive to the successful registration and equipment identity check, AMF 621 interfaces with UDM 628 to generate UE context that comprises QoS metrics, slice selection information, S-NSSAIs, subscribed service features, and PDU session information for UE 602. UDM 628 retrieves the UE context data from UDR 629 and transfers the context data to AMF 621. Since the device type of UE 602 is blacklisted for PCF registration, AMF 621 skips PCF registration for UE 602. Once AMF 621 determines PCF registration is not available for IoT UE 602, AMF 621 interfaces with NSSF 625 to select an IoT network slice for UE 602. NSSF 625 indicates the slice ID for the IoT network slice to AMF 621. AMF 621 interfaces with SMF 622 to select one of UPFs 623 to serve UE 601. SMF 622 indicates the network address for the one of UPFs 623 that composes the IoT network slice to AMF 621. AMF 621 includes the slice ID returned by NSSF 625 and the network address for the one of UPFs 623 selected by SMF 622 in the UE context for UE 602. AMF 621 transfers a registration accept message comprising the UE context for UE 602 to N3IWF 624. N3IWF 624 transfers the registration accept message to the 3GPP NET in access node 614. The 3GPP NET in access node 614 transfers the registration accept message to the 3GPP NET in UE 602 over the LLCs, MACs, and PHYs. The 3GPP NET in UE 602 stores the UE context in memory.

An IoT application in UE 602 executes initiating an IoT PDU session. The 3GPP NET detects the execution and responsively supports the IoT PDU session. The IoT application generates uplink user data for the IoT PDU session. The 3GPP NET in UE 602 transfers the uplink IoT data to the 3GPP NET in access node 614 over the LLCs, MACs, and PHYs. The 3GPP NET in access node 614 transfers the uplink IoT data to N3IWF 624. N3IWF 624 transfers the uplink IoT data to the one of UPFs 623 that composes the IoT network slice provisioned to UE 602. The one of the UPFs 623 transfers the uplink IoT data to data network 641. Data network 641 generates downlink IoT data for the IoT PDU session and transfers the downlink data to the one of UPFs 623. The one of UPFs 623 transfers the downlink IoT data to N3IWF 624. N3IWF 624 transfers the downlink IoT data to the 3GPP NET in access node 614. The 3GPP NET in access node 614 transfers the downlink IoT data to the 3GPP NET in UE 602 over the LLCs, MACs, and PHYs.

The wireless data network circuitry described above comprises computer hardware and software that form special-purpose network circuitry to qualify user devices for network policy association. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to qualify user devices for network policy association.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to qualify user devices for network policy association, the method comprising:

receiving an equipment identity check request transferred by a control plane that comprises an International Mobile Equipment Identifier (IMEI) for a User Equipment (UE);

reading the IMEI to determine a Type Allocation Code (TAC) for the UE;

comparing the TAC for the UE to an IMEI TAC database that indicates whether Policy Control Function (PCF) registration is available for the UE, wherein the PCF registration is available for the UE when the UE comprises a capability to enforce a network policy obtained from a PCF;

determining when the PCF registration is available for the UE; and transferring an equipment identity check response that indicates when the PCF registration is available for the UE to the control plane.

2. The method of claim 1 wherein:

the equipment identity check request comprises an N15 registration parameter; and reading the IMEI to determine the TAC, comparing the TAC for the UE to the IMEI TAC database, and determining when the PCF registration is available comprises reading the IMEI to determine the TAC, comparing the TAC for the UE to the IMEI TAC database, and determining when the PCF registration is available in response to the N15 registration parameter.

3. The method of claim 1 further comprising:

when the PCF registration is available for the UE, determining when the PCF registration is available for access and mobility policies and when the PCF registration is available for the UE policies; and wherein:

transferring the equipment identity check response comprises transferring the equipment identity check response that indicates when the PCF registration is available for the access and mobility policies and when the PCF registration is available for the UE policies for the UE to the control plane.

4. The method of claim 1 wherein when the PCF registration is not available for the UE, transferring the equipment identity check response comprises transferring the equipment identity check response that indicates the PCF registration is not available for the UE to the control plane.

5. The method of claim 1 further comprising hosting the IMEI TAC database.

6. The method of claim 5 wherein the IMEI TAC database comprises a range of TACs eligible for the PCF registration.

7. The method of claim 5 wherein the IMEI TAC database comprises a range of TACs prohibited from the PCF registration.

8. A wireless communication network to qualify user devices for network policy association, the wireless communication network comprising:

a network data system configured to:

receive an equipment identity check request transferred by a control plane that comprises an International Mobile Equipment Identifier (IMEI) for a User Equipment (UE);

read the IMEI to determine a Type Allocation Code (TAC) for the UE;

compare the TAC for the UE to an IMEI TAC database that indicates whether Policy Control Function (PCF) registration is available for the UE, wherein the PCF registration is available for the UE when the UE comprises a capability to enforce a network policy obtained from a PCF;

determine when the PCF registration is available for the UE; and transfer an equipment identity check response that indicates when the PCF registration is available for the UE to the control plane.

9. The wireless communication network of claim 8 wherein:

the equipment identity check request comprises an N15 registration parameter; and the network data system is further configured to read the IMEI to determine the TAC, compare the TAC for the UE to the IMEI TAC database, and determine when the PCF registration is available in response to the N15 registration parameter.

10. The wireless communication network of claim 8 wherein:

when the PCF registration is available for the UE, the network data system is further configured to:

determine when the PCF registration is available for access and mobility policies and when the PCF registration is available for the UE policies; and transfer the equipment identity check response that indicates when the PCF registration is available for the access and mobility policies and when the PCF registration is available for the UE policies for the UE to the control plane.

11. The wireless communication network of claim 8 wherein:

when the PCF registration is not available for the UE, the network data system is further configured to:

transfer the equipment identity check response that indicates the PCF registration is not available for the UE to the control plane.

12. The wireless communication network of claim 8 wherein the network data system is configured to host the IMEI TAC database.

13. The wireless communication network of claim 12 wherein the IMEI TAC database comprises a range of TACs eligible for the PCF registration.

14. The wireless communication network of claim 12 wherein the IMEI TAC database comprises a range of TACs prohibited from the PCF registration.

15. One or more non-transitory computer-readable storage media having program instructions stored thereon to qualify user devices for network policy association, wherein the program instructions, when executed by a computing system, direct the computing system to perform operations, the operations comprising:

receiving an equipment identity check request transferred by a control plane that comprises an International Mobile Equipment Identifier (IMEI) for a User Equipment (UE);

reading the IMEI to determine a Type Allocation Code (TAC) for the UE;

comparing the TAC for the UE to an IMEI TAC database that indicates whether Policy Control Function (PCF) registration is available for the UE, wherein the PCF registration is available for the UE when the UE comprises a capability to enforce a network policy obtained from a PCF;

determining when the PCF registration is available for the UE; and transferring an equipment identity check response that indicates when the PCF registration is available for the UE to the control plane.

16. The non-transitory computer-readable storage media of claim 15 wherein:

the equipment identity check request comprises an N15 registration parameter; and reading the IMEI to determine the TAC, comparing the TAC for the UE to the IMEI TAC database, and determining when the PCF registration is available comprises reading the IMEI to determine the TAC, comparing the TAC for the UE to the IMEI TAC database, and determining when the PCF registration is available in response to the N15 registration parameter.

17. The non-transitory computer-readable storage media of claim 15 wherein the operations further comprise:

when the PCF registration is available for the UE, determining when the PCF registration is available for access and mobility policies and when the PCF registration is available for the UE policies; and wherein:

transferring the equipment identity check response comprises transferring the equipment identity check response that indicates when the PCF registration is available for the access and mobility policies and when the PCF registration is available for the UE policies for the UE to the control plane.

18. The non-transitory computer-readable storage media of claim 15 wherein when the PCF registration is not available for the UE, transferring the equipment identity check response comprises transferring the equipment identity check response that indicates the PCF registration is not available for the UE to the control plane.

19. The non-transitory computer-readable storage media of claim 15 wherein the operations further comprise hosting the IMEI TAC database.

20. The non-transitory computer-readable storage media of claim 19 wherein the IMEI TAC database comprises one of a range of TACs eligible for the PCF registration or a range of TACs prohibited from the PCF registration.

* * * * *